United States Patent
Morris et al.

(10) Patent No.: US 12,041,087 B1
(45) Date of Patent: Jul. 16, 2024

(54) INTELLIGENT ANTI-PHISHING MANAGEMENT

(71) Applicant: Copperfasten Technologies Limited, Galway (IE)

(72) Inventors: Sean Morris, Galway (IE); Neil Farrell, Galway (IE)

(73) Assignee: Cooperfasten Technologies Limited, Galway (IE)

(*) Notice: Subject to any disclaimer, the term of this patent is extended or adjusted under 35 U.S.C. 154(b) by 0 days.

(21) Appl. No.: 18/506,475

(22) Filed: Nov. 10, 2023

Related U.S. Application Data

(60) Provisional application No. 63/504,717, filed on May 26, 2023.

(51) Int. Cl.
*H04L 9/40* (2022.01)

(52) U.S. Cl.
CPC ...... *H04L 63/1483* (2013.01); *H04L 63/1416* (2013.01); *H04L 63/1425* (2013.01)

(58) Field of Classification Search
CPC .................................................. H04L 63/1483
See application file for complete search history.

(56) References Cited

U.S. PATENT DOCUMENTS

| | | | |
|---|---|---|---|
| 10,313,386 B1* | 6/2019 | Roturier | H04L 63/107 |
| 10,623,431 B2* | 4/2020 | Ford | H04L 63/1416 |
| 11,973,801 B2* | 4/2024 | Grealish | H04L 63/1483 |
| 2008/0244715 A1* | 10/2008 | Pedone | H04L 63/1441 726/5 |
| 2015/0205957 A1* | 7/2015 | Turgeman | G06F 21/554 726/23 |
| 2017/0118187 A1* | 4/2017 | El Khoury | H04L 63/1466 |
| 2020/0028857 A1* | 1/2020 | Warmenhoven | H04L 63/1425 |
| 2020/0089848 A1* | 3/2020 | Abdelaziz | H04L 63/1441 |
| 2020/0089887 A1* | 3/2020 | Luthra | G06F 21/577 |
| 2020/0145447 A1* | 5/2020 | Coffey | H04L 63/1425 |
| 2020/0259852 A1* | 8/2020 | Wolff | H04L 67/10 |
| 2020/0396190 A1* | 12/2020 | Pickman | H04L 67/10 |
| 2021/0273957 A1* | 9/2021 | Boyer | H04L 67/141 |
| 2022/0201000 A1* | 6/2022 | Kim | H04W 12/60 |
| 2022/0230241 A1* | 7/2022 | Chougule | G06Q 40/04 |

(Continued)

*Primary Examiner* — Khang Do
(74) *Attorney, Agent, or Firm* — NIXON PEABODY LLP

(57) ABSTRACT

Systems and methods are disclosed for monitoring, evaluating protection against, improving protection against, and simulating phishing threats. Network usage information for users of an organization can be leveraged to determine user-specific network behavior information. This user-specific network behavior information can then be leveraged to better identify incoming threats as well as generate and deploy user-specific phishing lures. Phishing simulation campaigns can be conducted, including by implementing variations in how the phishing lures are presented. Such campaigns can be scored to determine how different presentation variations perform. User-specific phishing lures can be generated using user environment information collected by an agent running on the user's device. Alerts informing users of potential threats can be dynamically updated with different presentation parameters to improve performance. Digital communications identified as threats can be used to generate hashes to speedily identify subsequent digital communications that are threats.

29 Claims, 10 Drawing Sheets

(56) References Cited

U.S. PATENT DOCUMENTS

| | | | |
|---|---|---|---|
| 2022/0417277 A1* | 12/2022 | Ben-Noon | H04L 63/102 |
| 2023/0013808 A1* | 1/2023 | Myneni | H04L 63/1425 |
| 2023/0086556 A1* | 3/2023 | Himler | H04L 63/1441 |
| 2023/0097370 A1* | 3/2023 | Komashinskiy | H04L 63/1425 726/22 |
| 2023/0308460 A1* | 9/2023 | Thomas | H04L 63/08 |
| 2023/0403298 A1* | 12/2023 | Silva | H04L 63/1483 |
| 2024/0080318 A1* | 3/2024 | Crabtree | H04L 63/105 |

* cited by examiner

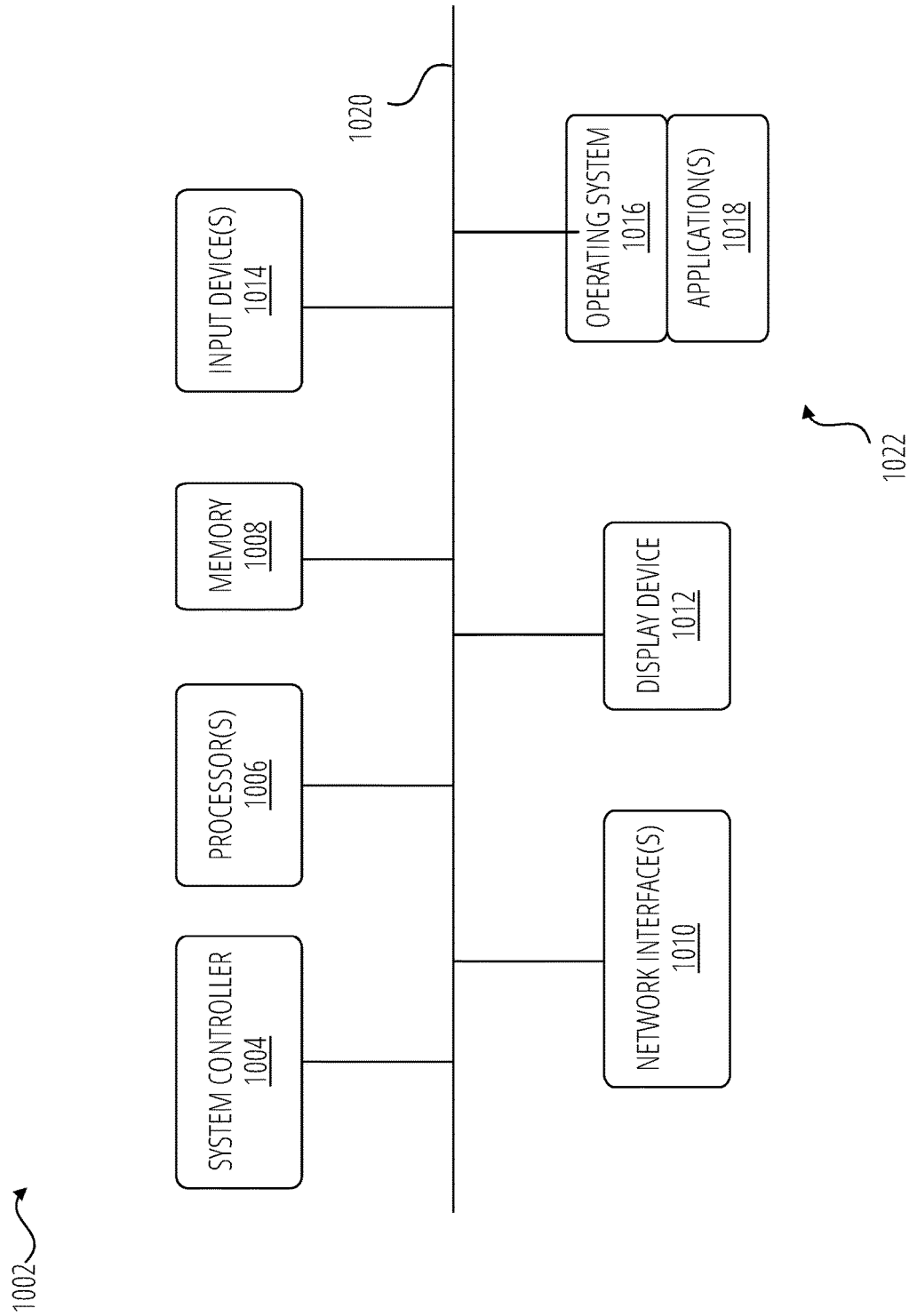

INTELLIGENT ANTI-PHISHING MANAGEMENT

CROSS-REFERENCE TO RELATED APPLICATIONS

The present application claims the benefit of U.S. Provisional Patent Application No. 63/504,717 filed May 26, 2023, and entitled "METHODS FOR COUNTERING E-MAIL PHISHING ATTACKS," the disclosure of which is hereby incorporated by reference in its entirety.

TECHNICAL FIELD

The present disclosure relates to computer security generally and more specifically to monitoring, evaluating protection against, improving protection against, and simulating phishing threats.

BACKGROUND

Traditional approaches to protecting against phishing-based cyberattacks involve methods such as i) labeling inbound emails as originating from an outside source; ii) analyzing inbound emails and quarantining those that are detected as dangerous; and iii) sending blanket phishing vulnerability campaigns to users to test users' vulnerability. Labeling emails can be helpful in some circumstances, but can easily start to be ignored by users due to the familiarization effect and can cannot protect from internally originating emails. Analyzing and quarantining inbound emails can be helpful in some circumstances, but must be set up to properly quarantine unwanted emails without generating too many false positives, which can lead users to not receiving important emails. As a result, operators of such systems must strike a balance between stronger protection and fewer false positives, thus allowing some phishing attempts to pass quarantine. Finally, current phishing vulnerability campaigns make use of generically created emails designed to trick a bulk of users into clicking on a link or downloading a file. These campaigns can be helpful to train against generic phishing attempts, but are ineffective against more sophisticated phishing attempts, such as spear phishing, where a phishing attempt is specifically targeted for a particular individual.

Additionally, traditional approaches to protecting against phishing-based cyberattacks are reactive in nature, with threat identification, training, and vulnerability campaigns implemented in response to or based on known prior threats from the organization or from the industry as a whole. For example, many vulnerability campaigns rely on generic phishing lures that are created by individuals using one or more previous phishing attempts as a starting point. Thus, these traditional approaches are unable to act proactively and anticipate future attacks that have not yet occurred.

There is a need for advanced anti-phishing systems and techniques that cure the deficiencies of current technologies.

BRIEF SUMMARY

In one aspect, a computer-implemented method includes receiving network usage information associated with a user. The method further includes determining user-specific network behavior information based on the network usage information. The user-specific network behavior information is indicative of how the user has interacted with a set of assets. The method further includes receiving a digital communication. The method further includes identifying the digital communication as being associated with at least one asset of the set of assets. The method further includes determining that the digital communication is a threat based at least in part on the user-specific network behavior information associated with the at least one asset of the set of assets. The computer-implemented method also includes employing a threat-abatement procedure with respect to the digital communication.

In one aspect, a computer-implemented method includes receiving network usage information associated with a user. The method further includes determining user-specific network behavior information based on the network usage information. The user-specific network behavior information is indicative of how the user has interacted with a set of assets. The method further includes generating and deploying a user-specific phishing lure based at least in part on the user-specific network behavior information. Deploying the user-specific phishing lure facilitates presentation of the user-specific phishing lure on the user device.

In one aspect, a computer-implemented method includes conducting a phishing simulation campaign to generate and deploy a plurality of phishing lures based on one or more presentation variations. The method further includes receiving simulation response information associated with the plurality of phishing lures. The simulation response information is indicative of how the plurality of phishing lures were responded to. The method further includes generating scoring information based at least in part on the simulation response information and the one or more presentation variations.

In one aspect, a computer-implemented method includes receiving user environment information. The user environment information is collected by an agent running on a user device being used by a user. The user environment information includes information about the computing environment of the user device. The method further includes generating and deploying a user-specific phishing lure based at least in part on the user environment information. Deploying the user-specific phishing lure facilitates presentation of the user-specific phishing lure on the user device.

In one aspect, a computer-implemented method includes receiving network usage information associated with a user. The method further includes determining user-specific network behavior information based on the network usage information. The method further includes receiving a first digital communication. The first digital communication being identified as a threat. The method further includes generating and presenting a first alert in association with the first digital communication based at least in part on the user-specific network behavior information. The first alert is generated and presented using a first set of presentation parameters. The method further includes receiving a second digital communication. The second digital communication being identified as a threat. The method further includes generating and presenting a second alert in association with the second digital communication based at least in part on the user-specific network behavior information and the first alert. The second alert is generated and presented using a second set of presentation parameters that is different from the first set of presentation parameters.

In one aspect, a computer-implemented method includes receiving a digital communication. The method further includes receiving an indication that the digital communication is identified as a threat. The method further includes generating a hash of the digital communication. The method further includes receiving a subsequent digital communication. The method further includes determining that the subsequent digital communication satisfies the hash. The method further includes identifying the subsequent digital communication as a threat in response to determining that the subsequent digital communication satisfies the hash.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 10 is a block diagram of an example system architecture for implementing features and processes of the present disclosure.

DETAILED DESCRIPTION

Figure 1:
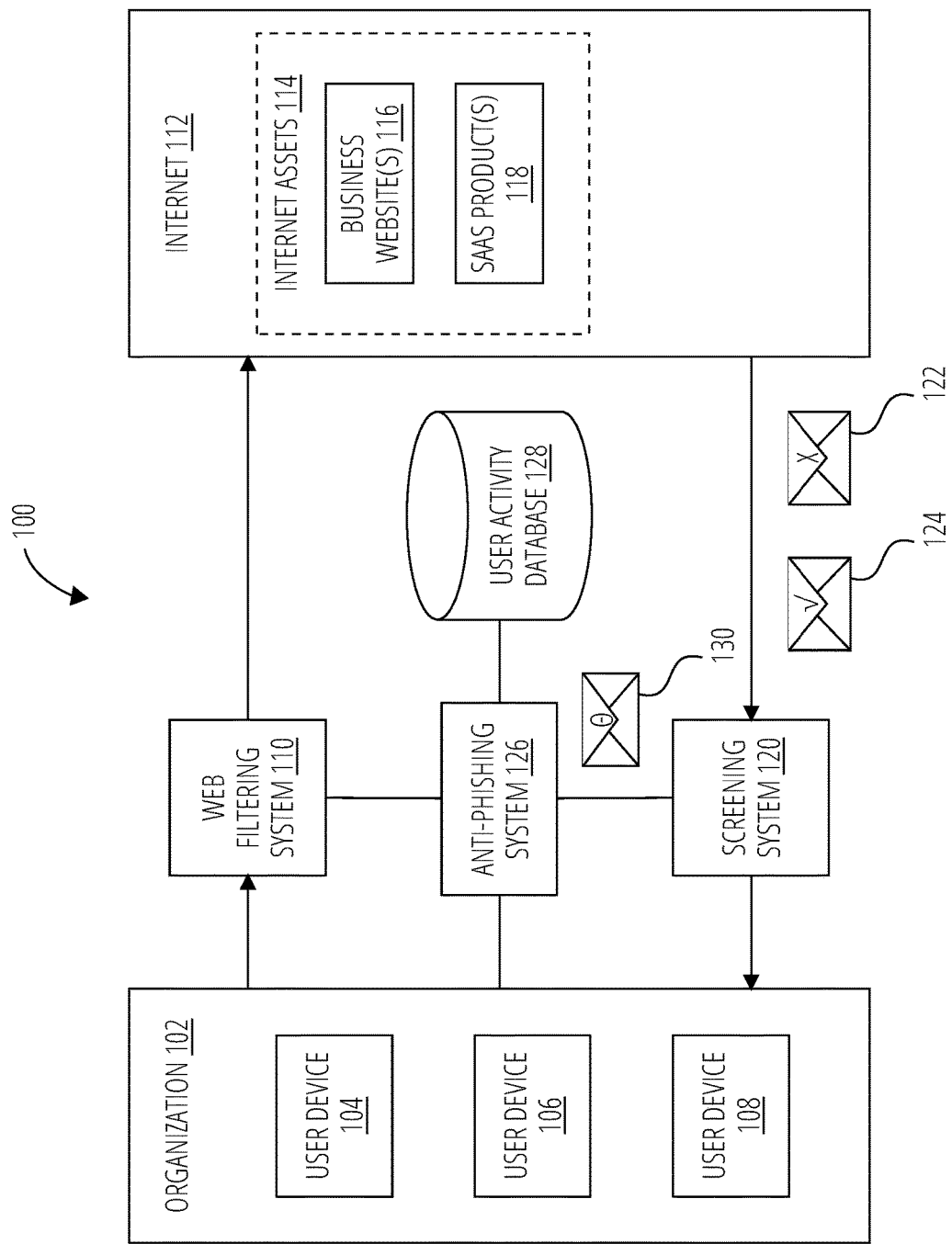
FIG. 1 is a block diagram depicting a computing environment with an anti-phishing system, according to certain aspects of the present disclosure.

Certain aspects and features of the present disclosure relate to leveraging network usage information for a user to identify certain user-specific network behavior information about that user, including assets (e.g., company websites and software as a service products) used by the user and patterns of behaviors associated with the user making use of those assets. This user-specific network behavior information can be leveraged to determine whether an incoming digital communication is a threat or not a threat. When a threat is detected, some threat-abatement procedure can be performed.

Certain aspects and features of the present disclosure relate to leveraging user-specific network behavior information to generate and deploy a user-specific phishing lure. Large scale phishing simulation campaigns can be performed on organizations by automatically generating user-specific phishing lures for users of the organization.

Certain aspects and features of the present disclosure relate to evaluating an organization's susceptibility to phishing based on phishing lures generated using different presentation variations. Thus, poorly performing presentation variations can be targeted for further training or increased threat-abatement procedures.

Certain aspects and features of the present disclosure relate to generating and deploying user-specific phishing lures based on user-specific information about the user's computing environment. This user environment information can be obtained from a user agent running on the user's computing system.

Certain aspects and features of the present disclosure relate to dynamic threat alerts. When a threat, such as a phishing attempt, is detected, an alert can be provided to the user, such as in the form of an email banner. The style, form, or other presentation parameters associated with how the alert is presented can be dynamically selected. For example, if it is determined that the user is likely too used to a first form of alert, the system can dynamically present a second form of alert when the next threat is detected.

Certain aspects and features of the present disclosure relate to storing and leveraging hashes of communications identified as threats to automatically identify future communications as likely threats.

Phishing is a practice by which bad actors send digital communications to recipients with the goal of having a recipient take some sort of action, often clicking a hyperlink, to obtain personal information, private information, or otherwise secret information. For example, bad actors may send email messages purporting to be from the user's bank and including a hyperlink to take further action. If the recipient clicks on this hyperlink, they may be taken to a website that appears to be a log-in page for their bank, but is actually a fraudulent page set up by the bad actor to collect the recipient's login information and password. With this information, the bad actor can empty the recipient's bank account and possibly compromise the recipient further.

Phishing has a relatively low barrier to entry, as the costs and technical knowhow necessary to create a fraudulent website and send out mass emails are relatively low. As such, the prevalence of phishing has been on the rise. Some bad actors use further advanced techniques to target individuals directly using information specific to that user, such as sending a message that purports to be from a manager or officer of that user's company. Over time, phishing techniques will continue to evolve and become more difficult to discern from legitimate communications.

Individuals and organizations may wish to combat phishing and other threats, such as through screening tools, filtering tools, user evaluation, and user training.

Screening tools are tools that screen incoming communications to identify possible threats before the incoming communication is passed to a user to view. Some existing screening tools will look for commonly seen signs of possible threats, then may quarantine the threat, pass along a modified version of the communication (e.g., with hyperlinks removed), or pass along the communication along with a notification that the communication may be a threat. Examples of screening tools include secure email gateways and integrated cloud email security systems.

Filtering tools filter outgoing communications and requests (e.g., website requests) to stop bad actors from receiving the personal, private, or otherwise secret information. For example, some domain name service (DNS) filtering systems can automatically block access to web domains known for or suspected of phishing.

User evaluation can include delivering simulated threats (e.g., a simulated phishing communication) to users and evaluating how the user responds to the simulated threat. For example, users who click on links or reply to simulated threats may score low and may be subject to additional training, whereas users who correctly identify the possible threat may score high. User evaluation can be helpful in determining where funds and time should be spent to improve the organization's susceptibility to threats, such as by having low-scoring individuals perform more training and not wasting too much extra training on high-scoring individuals.

User training itself can include training users how to identify threats. Training can include generating simulated threats and accessing actual threats to use in teaching the users how to identify the threats.

As used herein, the term "threat" when used with reference to digital communications (e.g., an email or other message) is intended to include malicious communications (e.g., communications that cause harm to a computing system or network when received, opened, or otherwise acted upon) and phishing communications (e.g., communications that intend to provoke the recipient into taking an action or disclosing private, secret, or personal information under false pretenses). In some cases, a digital communication classified as a threat can also include other types of digital communications, such as spam communications (e.g., unsolicited/undesired communications, which may include commercial offers or misleading information). In some cases, malicious communications can be a subset of phishing communications in which the phishing communication is intended to induce the recipient to take an action to harm the computing system or network of the recipient. For example, an email can be sent from a bad actor purporting to be the recipient's bank and asking the recipient to open an attachment, which, when opened, causes harm to the user's computing system.

A digital communication can be an actual threat (e.g., a phishing email sent from a bad actor), a simulated threat (e.g., a simulated phishing email sent from a security company hired by the organization to evaluate its users), or a non-threat (e.g., an email from a bank to a user regarding the user's bank account). As used herein, when a system identifies a digital communication as a threat, the system can be identifying the digital communication as a likely threat with a particular degree of confidence. For example, if the system is 90% sure that a given communication is a threat, the system can identify the communication as a threat and can provide a confidence value of 90.

As used herein, the term "digital communication" refers to any suitable type of communication transmitted via a digital network. Generally, digital communications are communications that include text and/or images, although that need not always be the case. Examples of suitable digital communications include emails, instant messages, and the like. A digital communication can be associated with an actual sender, a purported sender, and one or more recipients. The actual sender is the actual initiator of the digital communication (e.g., the true from email address in an email), which in some cases is the same as the purported sender. The purported sender is the person or entity who is identified as the sender from the content of the digital communication (e.g., body of an email) or from metadata that does not identify the actual sender (e.g., a reply-to address in an email). The recipient or recipients are those to whom the digital communication is directed (e.g., a TO address or CC address in an email). Senders and recipients can be identified through addresses (e.g., email addresses), handles (e.g., messaging service handles), domains, or the like.

As used herein, the term "instant message" refers to a message sent to a recipient using a digital messaging service. The term "instant" as used in the term "instant message" is intended to be used colloquially and not intended to indicate that any aspect of transmitting and/or receiving the message must occur instantaneously. While an instant message is often used for synchronous or realtime communication, that need not always be the case. An instant message may be received at any suitable time after the message is initially transmitted. Examples of instant messaging services include WhatsApp (R), Slack (R), Facebook Messenger (R), Apple iMessage (R) and the like. In some cases, instant messages can further include short messages transmitted via a short messaging service (SMS) protocol (e.g., cellular text messages) or the like.

As used herein, the term "phishing lure" refers to a digital communication generated to simulate a phishing attempt. The phishing lure can be optionally based on previously detected phishing attempts. A phishing lure can include one or more action prompts, each of which can be used to provoke a recipient into taking a desired action. Examples of suitable action prompts include i) a hyperlink; ii) an attached file; iii) a request for a reply; and iv) a request for external action (e.g., request for a phone call or text message). When a user engages an action prompt (e.g., clicks a hyperlink, downloads and/or opens an attached file, replies to the communication, takes the requested external action), a system can log the user's action to identify how the user responded to the phishing lure. In some cases, additional action can be taken (e.g., an alert can be presented to a user). If a user were to engage an action prompt of an actual phishing attempt, the user may compromise a computing device, compromise a computing network, divulge personal, private, or secret information, or the like.

As used herein, the term "phishing simulation campaign" refers to a collection of actions taken to engage one or more users with one or more digital communications designed to mimic an actual phishing attempt. The phishing simulation campaign can include generating and sending one or more phishing lures to one or more users. In some cases, a phishing simulation campaign can include collecting phishing lure response data indicative of how the user(s) responded to the phishing lure(s). In some cases, the phishing simulation campaign can include analyzing the phishing lure response data to generate one or more findings, generate one or more suggested improvement actions (e.g., actions designed to improve how the user(s) respond to actual or simulated phishing attempts), or automatically take one or more suggested improvement actions.

As used herein, the term "phishing lure response data" refers to data indicative of how one or more users responded to one or more phishing lures. Phishing lure response data can indicate one or more users performed positive response actions and/or negative response actions, and in some cases neutral response actions. Positive response actions can be actions that indicate that the user identified the phishing lure as a potential phishing attempt or a simulated phishing attempt. Examples of such positive response actions include (i) the user deleting the phishing lure; (ii) the user reporting the phishing lure to a relevant individual or department (e.g., an information technology department); (iii) the user warning others of the phishing lure; (iv) the user marking the phishing lure as spam or as a threat; or (v) any combination of (i)-(iv). Negative response actions can be actions that indicate that the user fell victim to the phishing lure in some fashion. Examples of negative response actions include the user taking or attempting to take any actions prompted by the phishing lure, such as clicking on a hyperlink, opening of an attachment, replying to the phishing lure, or the like. In some cases, neutral response actions can include actions or lack-of-action that indicates that the user did not recognize the phishing lure as a phishing attempt or simulated phishing attempt, but also did not fall victim to the phishing lure. Examples of neutral response actions include not opening the phishing lure and/or opening the phishing lure but not taking any positive response actions or negative response actions (e.g., simply leaving an email phishing lure in the inbox or stored in another folder). In some cases, however, neutral response actions can be considered to be positive response actions.

As used herein, the term "presentation variations" refers to different ways in which a digital communication can be presented, including i) different ways in which the digital communication can be generated, and ii) different ways in which the digital communication can be deployed. Examples of presentation variations include i) a text content variation (e.g., variation in the underlying content of the text of the digital communication); ii) an image content variation (e.g., variation in the underlying images selected for use in a digital communication); iii) a text quality variation (e.g., variation in the quality of the text content, including variations in grammar, spelling, and the like); iv) an image quality variation (e.g., variation in the quality of a selected image, such as variations in resolution, color depth, cropping, and the like); v) a formatting variation (e.g., variation in the formatting of text of images, such as font choice, font size, image placement, and the like); vi) a timing variation (e.g., variation in the timing of when the digital communication is sent or received); or vii) any combination of i-vi. Other presentation variations can exist.

In some cases, certain aspects and features of the present disclosure can leverage organizational information associated with user(s), such as job title, department, and the like. In some cases, this organizational information can be received from a human resources database, although that need not always be the case. In some cases, it can be received from network usage information itself (e.g., from a signature line in an outgoing email). In some cases, this organizational information can be leveraged to generate user-specific lures, determine when or how often to generate and deploy user-specific lures in a campaign, or the like. For example, certain job titles (e.g., CEO) may receive more in-depth phishing lures and/or additional phishing lures as part of a phishing simulation campaign than other job titles. In some cases, users with higher levels of access or privilege (e.g., information technology administrators) to the organization's network may receive more in-depth phishing lures and/or additional phishing lures as part of a phishing simulation campaign than individuals without such access or privilege (e.g., restricted users).

Certain aspects and features of the present disclosure provide an improvement in the functioning of a technology or technical field, such as computer security, namely anti-phishing technologies. Certain aspects of the present disclosure enable systems to generate, on an organizational scale, user-specific phishing lures that can better simulate certain advanced phishing techniques (e.g., spear phishing). These better simulations can result in more accurate evaluation of an organization's susceptibility to phishing and can result in better and more specific training to users in the organization. Additionally, certain aspects of the present disclosure allow for actual phishing attempts to be monitored and identified with improved accuracy, especially on a user-specific basis. Further, certain aspects of the present disclosure allow for improved techniques to alert users of phishing attempts that can dynamically update to avoid the familiarization effect and otherwise optimize individual users' responses to alerts of phishing attempts. Further, certain aspects of the present disclosure enable phishing lures to be generated in a proactive fashion rather than a reactive fashion, with new user-specific phishing lures being generated from network usage data instead of relying on previously received phishing attempts.

Certain aspects of the present disclosure provide additional improvements as well, including to other technologies and fields of technology.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative embodiments but, like the illustrative embodiments, should not be used to limit the present disclosure. The elements included in the illustrations herein may not be drawn to scale.

FIG. 1 is a block diagram depicting a computing environment 100 with an anti-phishing system 126, according to certain aspects of the present disclosure. In some cases, the computing environment 100 can include additional or fewer components than shown in FIG. 1.

An organization 102 can include a set of users, such as members, employees, agents, representatives, partners, and the like. Users can access network-accessible resources through one or more user devices 104, 106, 108. While depicted with three user devices 104, 106, 108 in FIG. 1, an organization 102 can include any number of user devices. A user device 104, 106, 108 can be any suitable computing device used by a user, such as a smartphone, a personal computer, a smart television, a gaming console, or the like.

A user can make use of a user device 104 to access the internet 112, such as to access an internet asset 114. Internet assets 114 are internet-accessible resources that can be leveraged by users, such as business websites 116 and software as a service (SaaS) products 118. Business websites 116 can include websites for businesses or organizations, such as banks, merchants, and the like. SaaS products 118 can include internet-accessible services, such as videoconferencing services, customer relationship management services, document signature services, document editing services, and the like.

When attempting to access the internet 112, any outgoing communications and/or requests (e.g., a hypertext transfer protocol (HTTP) request) may pass through a web filtering system 110 managed by or on behalf of the organization 102. The web filtering system 110 can block the user from accessing certain resources on the internet 112, such as resources inappropriate for the organization 102 or resources identified as potential threats. For example, a user device 104 can initiate a request by attempting to access a uniform resource locator (URL) associated with an internet asset 114. The URL can contain a domain name. The web filtering system 110 can be a DNS server that reads the domain name and identifies it as a domain name to block (e.g., a blacklist domain name) and deny access to the internet asset 114 and/or return an alert to the user device 104 notifying them that the internet asset 114 is potentially a threat, optionally requiring the user to provide approval prior to permitting access to the internet asset 114.

User devices 104, 106, 108 can also receive digital communications from the internet 112, and optionally, from others within the organization 102. In some cases, an incoming digital communication from the internet 112 can be a phishing threat 122 or other threat. For example, a phishing threat 122 may take the form of an email message that appears to be from a user's bank, but is actually a fraudulent message containing a hyperlink that will direct the user to a fraudulent website that will collect the user's login information and password. In some cases, an incoming digital communication from the internet 112 can be an authentic communication 124. An authentic communication 124 is a communication that is not a threat, but rather a digital communication that is from the apparent source. For example, an authentic communication 124 can be an email message that is authentically from the user's bank. In some cases, an incoming digital communication from within the organization can include a phishing threat 122 or other threat, such as in the case of a forwarded message.

Received digital communications can be processed by a screening system 120 before being passed to the user devices 104, 106, 108. Such a screening system 120 can analyze incoming digital communications to determine whether or not the digital communication is a threat, such as whether or not the digital communication is likely to contain malware, be a phishing attempt, or be spam. For example, the screening system 120 will attempt to block all phishing threats 122, but allow through all authentic communications 124. However, screening systems 120 are generally imperfect and cannot block all phishing threats 122 and let through all authentic communications 124, so some balance must be struck. In some cases, the screening system 120 operates only on digital communications coming from outside of the organization 102, although that need not always be the case.

The computing environment 100 can include an anti-phishing system 126. The anti-phishing system 126 can integrate with other components of the computing environment 100, such as the web filtering system 110 and screening system 120, and optionally the user devices 104, 106, 108. For example, when the anti-phishing system 126 is being used to help identify potential phishing threats 122, the anti-phishing system 126 may be integrated into the screening system 120.

The anti-phishing system 126 can perform the various processes and actions described herein to combat an organization's susceptibility to phishing attempts, such as monitoring, evaluating protection against, improving protection against, and simulating phishing threats.

In some cases, the anti-phishing system 126 can coordinate with the web filtering system 110 or a similar system and/or the screening system 120 or a similar system to track network usage information for the organization 102. This network usage information can include information about how the users of the organization 102 access network-accessible resources, such as internet assets 114, and how these users receive digital communications (e.g., external digital communications from outside of the organization 102). This network usage information can be analyzed to identify user-specific network behavior information. User-specific network behavior information can indicate how a user interacts with one or more network-accessible resources, such as internet assets 114, as well as how such internet assets 114 interact with the user (e.g., via digital communications). In some cases, the user-specific network behavior information can include information about incoming digital communications, such as a copy of an authentic communication 124, a template based on one or more authentic communications 124 (e.g., a template containing common information found in multiple authentic communications 124), metadata associated with the digital communication, or the like.

In an example, an anti-phishing system 126 can analyze network usage information of the organization 102 for a period of time (e.g., a week, a month, six months, a year, two years, etc.). This network usage information can be analyzed to identify what internet assets 114 are accessed by users of the organization 102, which users access particular internet assets 114, trends or patterns in how those internet assets 114 are accessed, which internet assets 114 send digital communications to particular users, and trends or patterns in how those internet assets 114 send digital communications. For example, analysis of the network usage information can identify that User A receives emails from Bank Z every Monday, Wednesday, and Friday at 1 pm and often accesses the Bank Z website Fridays between 2 pm and 3 pm. This information can be stored as user-specific network behavior information. As described in further detail herein, this information can be used to help identify potential threats, such as an email sent to User A and purporting to originate from Bank Z, but sent at an unusual time (e.g., 8 am on a Tuesday), or help generate user-specific phishing lures (e.g., a phishing lure pretending to originate from Bank Z and sent at an expected time, such as just before 1 pm on Monday, or sent soon after the user was expected to have accessed the Bank Z website, such as after 3 pm on Friday).

In some cases, the anti-phishing system 126 can be coupled to a user activity database 128. The user activity database 128 can store information about how one or more users of the organization 102 interact with the internet 112. For example, the user activity database 128 can store the user-specific network behavior information.

In some cases, the anti-phishing system 126 can generate phishing lures 130. Phishing lures 130 are digital communications that are designed to simulate actual phishing threats 122. The anti-phishing system 126 can generate the phishing lures 130 based on the information in the user activity database 128. For example, user-specific network behavior information can be used to generate a custom phishing lure 130 for User A that purports to be from Bank Z and uses a template generated from previous digital communications from Bank Z (e.g., that Bank Z had sent to User A and/or other users of the organization 102). In some cases, the anti-phishing system 126 can conduct phishing simulation campaigns across multiple users in the organization 102.

In some cases, the computing environment 100 can have additional or fewer components. For example, in some cases the computing environment 100 may not include a web filtering system 110 or may not include a screening system 120. The various components of computing environment 100 can be implemented using any suitable system or combination of systems. For example, the web filtering system 110 and/or screening system 120 can be implemented using one or more computing devices, such as servers, operated by or on behalf of the organization 102. The web filtering system 110 and screening system 120, as well as user devices 104, 106, 108 can be located in any suitable physical location including at an operating location of the organization 102 or other locations.

While various aspects and features of the present disclosure relate to accessing internet assets 114 and receiving incoming digital communications from the internet, in some cases, aspects and features of the present disclosure can instead be applied to accessing internal network assets and receiving incoming digital communications from an internal network.

Figure 2:
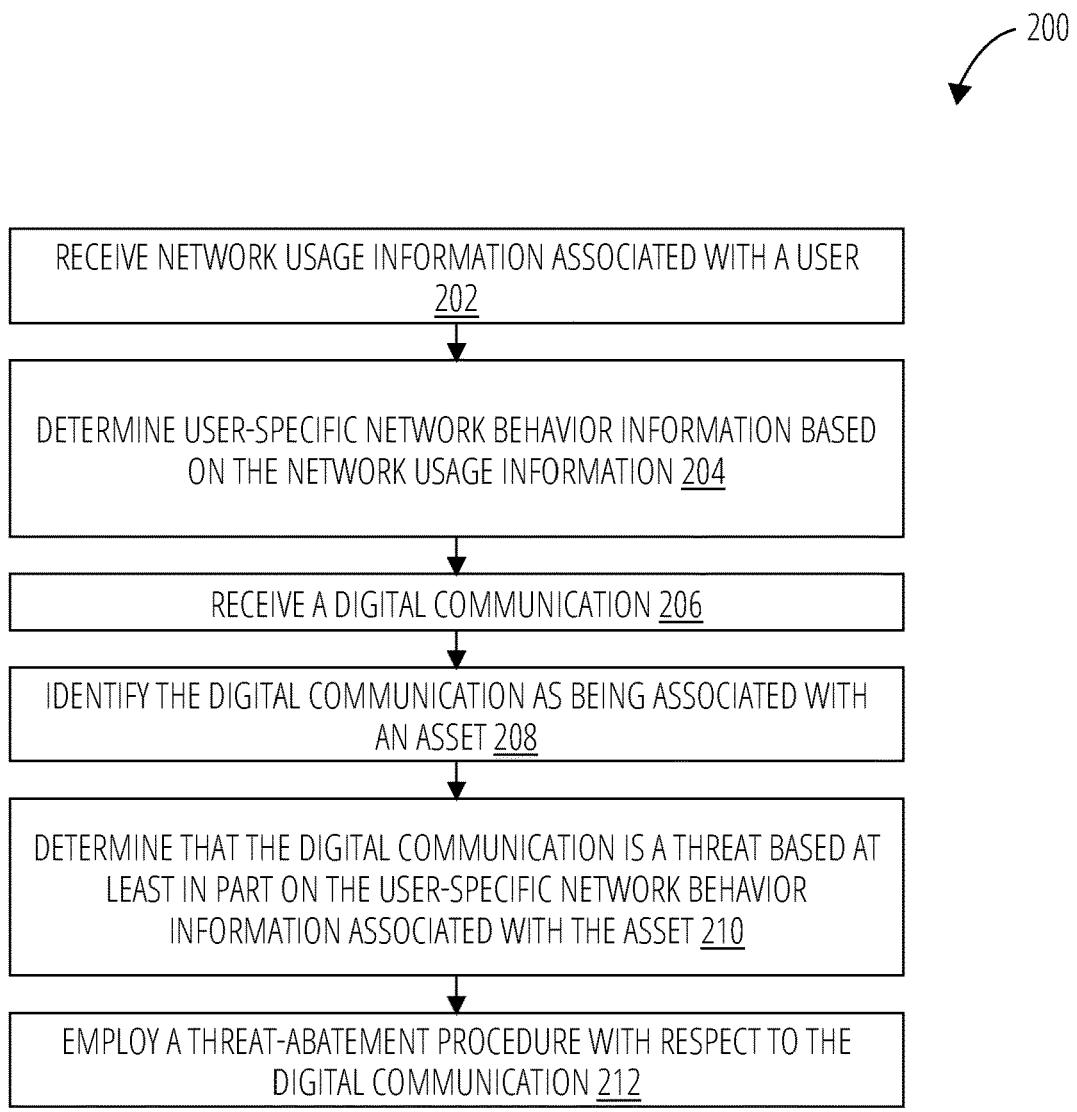
FIG. 2 is a flowchart depicting a process for customized threat-abatement, according to certain aspects of the present disclosure.

FIG. 2 is a flowchart depicting a process 200 for customized threat-abatement, according to certain aspects of the present disclosure. Process 200 can be performed using any suitable system, such as anti-phishing system 126 of FIG. 1.

At block 202, network usage information associated with a user is received. Examples of network usage information include (i) web browsing activity data; (ii) outgoing email traffic data; (iii) incoming email traffic data; (iv) outgoing instant message traffic data; (v) incoming instant messaging traffic data; or (vi) any combination of (i)-(v). Other network usage information may be used instead or in addition.

The network usage information can be received from a computing device on or associated with a network used by the user device to access the internet, such as a DNS server accessed by the user device. Receiving network usage information can occur for a period of time, such as a week, multiple weeks, a month, multiple months, a year, multiple years, or the like. Receiving the network usage information associated with a user at block 202 can include receiving network usage information for a plurality of users of an organization and selecting only the network usage information associated with the user.

At block 204, user-specific network behavior information is determined based on the network usage information. Determining the user-specific network behavior information can include analyzing the network usage information to identify interactions between the user and a set of assets (e.g., one or more assets). These assets are network-accessible assets, and can more specifically be internet assets. In some cases, each of the assets is a network-accessible asset (e.g., an internet-accessible website or internet-accessible SaaS product) that accepts user credentials.

Examples of user-specific network behavior information include, for each asset, (i) a domain associated with the respective asset; (ii) one or more subdomains associated with the respective asset; (iii) a domain category; (iv) access timing information (e.g., timing information about the user accessing the asset, such as when it was accessed and for how long); (v) sender information (e.g., addresses, handles, domains, or other identifiers associated with the actual sender and/or purported sender); (vi) recipient information (e.g., addresses, handles, domains, or other identifiers associated with the recipient or recipients, a number of recipients, and the like; (vii) digital communication timing information; or (viii) any combination of (i)-(vii).

Determining the user-specific network behavior information can include identifying the set of assets with which the user interacted (e.g., accessed, transmitted information to, or received digital communications from). Once the set of assets are identified, user-asset activity data can be determined. User-asset activity data can include data indicative of the interactions between the user and the assets of the set of assets. Determining the user-asset activity data can include, for each asset of the set of assets, determining interaction data between the user and the asset. Determining the interaction data can include identifying, in the network usage information, one or more interactions between the user and the asset. Such interactions can include user-initiated interactions (e.g., communications sent from the user, the user accessing a website, the user accessing an internet-accessible resource, etc.) or asset-initiated interactions (e.g., incoming digital communications). Examples of information that can be included in the interaction data include (i) the type of interaction; (ii) the initiator of the interaction; (iii) the recipient of the interaction, as appropriate; (iv) one or more times associated with the interaction (e.g., a sending time, an access time, a reply time, a read time, a time when a hyperlink is clicked or other action is taken, etc.); (v) content of the interaction; (vi) metadata associated with the interaction; or (vii) any combination of (i) to (vi). In some cases, interaction data can include web browsing activity data associated with the user accessing a website.

In some cases, determining the user-specific network behavior information can include determining one or more parameters associated with each asset, such as an access frequency (e.g., a frequency with which the user interacts with the asset or a frequency with which a particular interaction between the user and the asset occurs).

In some cases, determining the user-specific network behavior information can include storing a listing of assets, which can include each asset in the set of assets. In some cases, the listing of assets can include additional information associated with each asset, such as information about the domain name associated with the asset, information about actual or purported senders associated with the asset, information about names and logos used by the asset, information about the list of users that interact with the asset, and the like.

In some cases, determining user-specific network behavior information can include applying the network usage information to a machine learning model. The machine learning model can be trained to output a set of user-specific network behavior information based on the network usage information.

In some cases, determining user-specific network behavior information can further include training a classifier (e.g., a machine learning model) based on the user-asset activity data and optionally based on received phishing threats (e.g., received by the user or other users). The classifier can be trained to classify an incoming digital communication as a threat or not a threat, optionally with a degree of confidence.

At block 206, a digital communication can be received. Receiving a digital communication can include receiving an email, an instant message, or other such digital communication. Receiving the digital communication can include receiving the digital communication at a system, such as an anti-phishing system.

At block 208, the digital communication from block 206 is identified as being associated with at least one asset of the set of assets from block 204. For example, the digital communication can be analyzed to identify an actual sender or purported sender, which can be compared with actual senders or purported senders from previous digital communications received and analyzed at blocks 202, 204. Other information from the digital communication can be used to identify the asset from the set of assets that is associated with the digital communication.

At block 210, the digital communication is determined to be a threat based at least in part on the user-specific network behavior information associated with the at least one asset of the set of assets. The system can analyze the digital communication and compare it to the user-specific network behavior information to determine that the digital communication is a threat. In some cases, the system can apply a trained machine learning model, such as the classifier described with reference to block 204, to the received digital communication to classify the digital communication as a threat or not a threat. Determining a digital communication to be a threat at block 210 can include one or more of the use of statistical techniques, application of neural networks, use of template matching, and the like.

For example, a digital communication that is purported to be sent from an authentic sender (e.g., the actual sender used in digital communications from Bank Z to User A as identified in an instance of blocks 202, 204), but is actually sent from a different sender may be identified as possibly a threat. In another example, if the user-specific network behavior information indicates that the Bank Z has only ever sent emails during business hours, if the digital communication was sent outside of business hours, it may be identified as possibly a threat. Any other factor or combination of factors may be used to classify the received digital communication as a threat.

In some cases, the digital communication is only classified as a threat after at least a preset threshold or combination of factors indicate that the digital communication is a threat. In some cases, one or more factors can be analyzed to increase or decrease a threat score associated with the digital communication, and the digital communication can be identified as a threat if its threat score exceeds a preset threshold. The various thresholds, factors, and other aspects that control the sensitivity or other settings of how a digital communication is classified as a threat can be known as a threat-identification setting.

In some cases, these threat-identification settings (e.g., the different thresholds, combinations of factors, and score weightings) can be adjusted on a per-asset, per-user, or per-user-asset-combination basis. For example, for certain assets, such as those posing a relatively high risk to the organization 102, such as a website or SaaS product for producing company paychecks, the thresholds may be lower, thus identifying possible threats as likely threats more often. As another example, for users that are new or have been evaluated as being more susceptible to phishing attempts, the thresholds may be lower, thus identifying possible threats as likely threats more often. As another example, for a user who seems to regularly click on links in emails from their bank very soon after opening the email, the system may identify that there is an increased risk of this user unintentionally clicking on a phishing threat purporting to originate from that bank, and thus the system may adjust thresholds to be lower for digital communications to that particular user and associated with that particular asset, thus identifying possible threats as likely threats more often, which can be used to present alerts to the user to help them avoid unintentionally quickly clicking on a malicious link.

In some cases, threat-identification settings can be adjusted based on interaction data from block 204. In some cases, a user-asset risk score can be generated for each user-asset combination. The user-asset risk score can be a score indicative of the level of risk of the user being susceptible to a threat purporting to originate from the asset. For example, a sophisticated user interacting with a sophisticated internet asset that only sends regular and known emails may have a relatively low user-asset risk score, as there may be a low risk of the user being susceptible to a threat purporting to originate from that asset. However, a less sophisticated user who only occasionally interacts with an asset that sends out irregular emails having differing formats may have a higher user-asset risk score, as there may be a higher risk of that user being susceptible to a threat purporting to originate from that asset. Thus, for a relatively high user-asset risk score, the system may identify more of the incoming digital communications as potential threats than if the user-asset risk score was relatively low.

In some cases, determining user-specific network behavior information at block 204 can further include comparing interaction data associated with an asset with interaction data associated with a different asset. For example, a comparison can be made between how a user interacts with a first asset and how the user interacts with the second asset. In such cases, determining that the digital communication is a threat at block 210 can based on this comparison.

In some cases, determining that the digital communication is a threat at block 210 can be based at least in part on overriding asset information. Overriding asset information can be pre-defined based on the organization's specific concerns or activities. For example, it can be determined that certain SaaS products are especially critical to the function of the organization and a successful phishing attempt targeting these SaaS products would be highly problematic for the organization. For such SaaS products, the organization can establish overriding asset information defining these SaaS products as high-risk. In such cases, the overriding asset information can override or take priority over other considerations when determining whether the digital communication is a threat. For example, the system can identify the asset associated with the digital communication, identify that the asset is a high-risk asset based on overriding asset information, then adjust the threat-identification settings to a higher level and make a determination as to the digital communication based on those higher threat-identification settings.

At block 212, a threat-abatement procedure is deployed with respect to the digital communication. Deploying the threat-abatement procedure can include automatically performing one or more actions to reduce the likelihood that a user will take an undesired action in response to a phishing threat, such as clicking on a malicious link or providing private, personal, or secret information. Examples of threat-abatement procedures include (i) generating an alert for presentation to the user; (ii) generating an alert for presentation to someone other than the user, such as a manager; (iii) quarantining the digital communication; (iv) initiating a user-specific training procedure; or (v) any combination of (i) to (iv).

In some cases, deploying the threat-abatement procedure at block 212 can include generating and presenting an alert to a user. This alert can identify the digital communication as a threat. In some cases, generating the alert can include determining user-specific reasoning for why the digital communication is identified as a threat, and presenting the alert can include presenting this user-specific reasoning. Determining user-specific reasoning can include using the user-specific network behavior information. For example, if the user-specific network behavior information indicates that it is very unlikely for Bank Z to be sending digital communications to the user at 11:45 pm and the digital communication was identified as a threat at least in part due to it being sent to the user at 11:45 pm, the user-specific reasoning may include an indication that the digital communication was sent at an unusual time or unlikely time. The alert can be presented on a graphical user interface.

In some cases, an alert can be provided as metadata associated with the digital communication. In some cases, the alert can be presented in association with the digital communication. In some cases, the alert can take the form of an inline banner that is presented before or above the digital communication. In some cases, the alert can take the form of an inserted banner that is inserted into the digital communication, such as a warning message inserted at the top of the body of an email. In some cases, the alert can be presented in the same window as or a separate window (e.g., an alert window) from the digital communication. In some cases the alert can be presented as a modal alert prior to presenting the digital communication. The modal alert can include an option to continue without presenting the digital communication (e.g., to cancel presentation of the digital communication). In some cases, the alert can be presented prior to some or all of the digital communication being displayed to the user. In some cases, the alert can be presented prior to some or all of the digital communication being transmitted to (e.g., downloaded to) the user device. In some cases, the alert can include an option to cancel or continue displaying the digital communication, such that the user must actively press a button or otherwise provide input in response to the alert to cause the digital communication to be displayed.

In some cases, an alert can be provided to an individual other than the user. For example, an alert can be provided to a manager or an information technology staff member indicating that the user received a potential threat. In some cases, the other individual is provided an option take an action with respect to the digital communication, such as an option to delete, quarantine, deny access to, forward, permit access to, and/or otherwise act on the digital communication.

In some cases, deploying the threat-abatement procedure can include automatically quarantining the digital communication. In such cases, an alert can be additionally generated and presented to the user (or another individual) indicating that the digital communication was quarantined. For incoming digital communications, quarantining the digital communication can include storing the digital communication in a save location without providing it to the user's user device. For outgoing digital communications, quarantining the digital communication can include ceasing the digital communication from being transmitted to a third party (e.g., a recipient or an intermediary).

In some cases, deploying the threat-abatement procedure can include automatically initiating a user-specific training procedure. Automatically initiating the user-specific training procedure can include offering the user an option to acquire further training, automatically scheduling further training for a future date, or automatically commencing further training. Further training can take any suitable form, such as email interactions, written materials, video materials, and the like.

In some cases, deploying the threat-abatement procedure can include identifying that a user is preparing to reply to a suspected threat and generating an alert in response to the user preparing to reply to the suspected threat. For example, if a user clicks reply to a phishing threat email and starts typing a draft email reply, the system can generate an alert that will be presented to the user (e.g., such as via a pop-up alert window) and give them a warning that the email to which they are replying may be a phishing attempt, optionally reminding them not to include personal, private, or secret information. In some cases, the alert can be provided as the user is typing the reply email. In other cases, the alert can be provided after the user attempts to send the reply, but before the reply is fully sent. For example, if a reply to a suspected threat is identified as being sent out of the organization, it can be placed into a temporary quarantine while the user is sent an alert warning them that they may be replying to a phishing threat, giving the user an opportunity to cancel sending the reply or continue with sending the reply.

In some cases, deploying the threat-abatement procedure at block 212 can include identifying that the user fell victim to the suspected threat. In such cases, deploying the threat-abatement procedure can include adjusting one or more security settings associated with the user (e.g., to prevent the user from causing harm to the organization or to prevent the user from falling victim to subsequent phishing attempts), increasing sensitivity of how subsequent digital communications are categorized as being threats or not, automatically recommending or initiating training, or the like. In some cases, automatically initiating training can include locking the user out of certain functions (e.g., access to email, access to one or more applications on their user device, access to web browsers, etc.) until the training is completed.

Process 200 is depicted with a set of blocks presented in a certain order. In some cases, process 200 can include fewer, additional, and/or alternate blocks, including in different orders.

For example, in some cases, process 200 can include generating an interaction fingerprint associated with one or more of the assets of block 204. Interaction fingerprints can be user-specific, although that need not always be the case. Generating the interaction fingerprint can include using the user-specific network behavior information to determine a set of patterns, conditions, variables, or actions associated with interactions between the user and the asset that are indicative that the interaction is authentic. In such cases, determining that the digital communication is a threat at block 210 can include determining whether the digital communication fits the interaction fingerprint. For example, if the interaction fingerprint shows that the user's bank always sends an acknowledgement email following the user accessing the banks' website, a digital communication that purports to be an acknowledgement email but was sent at a time when the user did not or could not have accessed the bank's website can be determined to not fit the interaction fingerprint, and thus be determined to be a threat.

In some cases, generating an interaction fingerprint for an asset can include determining, based at least in part on timestamp information associated with a plurality of interactions associated with the asset, at least one of (i) an acceptable timing range for interactions with the asset, and (ii) an acceptable frequency range between interactions with the asset.

In some cases, the interaction fingerprint can be updated based on ongoing digital communications received from an asset and determined to be authentic. For example, if over time the frequency of authentic interactions changes, the interaction fingerprint for that particular asset can be updated.

In another example, in some cases process 200 can include receiving organizational network usage information and determining organization-specific network behavior information based on the organizational network usage information. Receiving of organizational network usage information and determining organization-specific network behavior information can be similar to blocks 202, 204, but being specific to an organization (e.g., all users of an organization) instead of being specific to a single user. In such cases, determining that a digital communication is a threat can be based on the organization-specific network behavior information instead of or in addition to the user-specific network behavior information. In some cases, an organization-asset risk score can be generated and used similarly to how a user-asset risk score is generated and used, as described herein, but for the organization instead of just a specific user. Similarly, in some cases organization-asset threat-identification settings can be generated and used similarly to how user-specific threat-identification settings are generated and used, as described herein, but for the organization instead of just a specific user.

As another example, in some cases process 200 can include receiving user feedback associated with one or more digital communications. This user feedback can indicate when a user identifies as a threat a piece of digital communication that was not flagged as a threat by the system, and/or when a user identifies as an authentic communication a piece of digital communication that was flagged as a threat by the system. In some cases, this user feedback can be used to further refine the system, such as by improving one or more templates or further training one or more machine learning models.

As used herein, many examples are provided of aspects or features that are specific to an asset (e.g., a user-asset risk score). In some cases, where appropriate, those aspects or features can be specific to a class or category of asset. For example, instead of establishing a user-asset risk score for a particular user and particular asset, a user-asset-class risk score can be established that covers all assets within a particular asset class or category. In such cases, identified assets can be grouped together by class or category.

In some cases, portions of process 200 can be integrated into portions of one or more other processes described herein.

Figure 3:
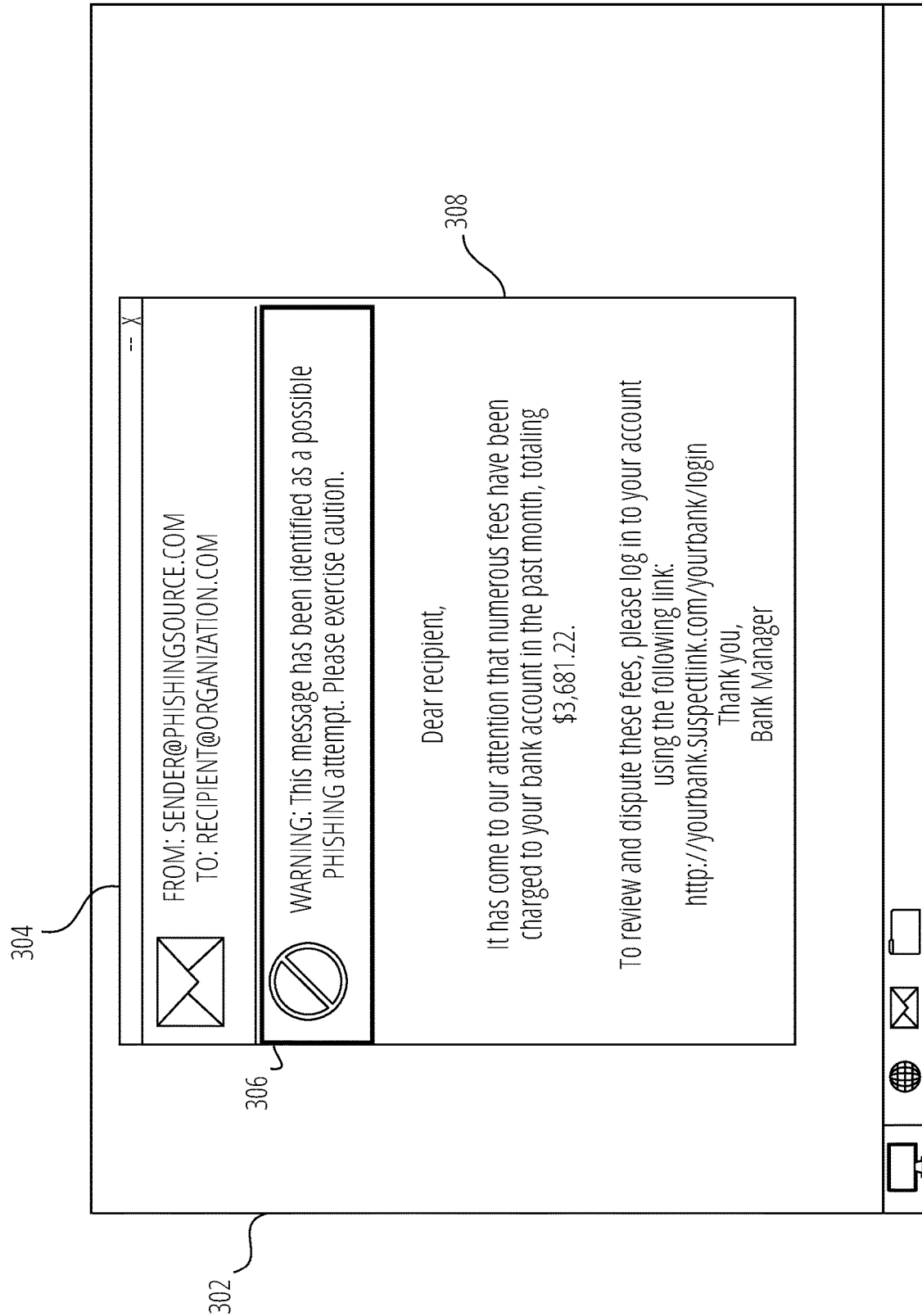
FIG. 3 is an illustration depicting a graphical user interface showing a first alert in conjunction with a suspected phishing threat, according to certain aspects of the present disclosure.

FIG. 3 is an illustration depicting a graphical user interface 302 showing a first alert 306 in conjunction with a suspected phishing threat, according to certain aspects of the present disclosure. The graphical user interface 302 can be implemented on any suitable device, such as a user device (e.g., user device 104 of FIG. 1).

The graphical user interface 302 can include a window 304 for displaying a received digital communication. The window 304 can be presented in any suitable fashion, such as a separate window or part of another window (e.g., a viewing pane within a window of an email application).

In some cases, presenting an alert as described herein, such as described with reference to FIG. 1, can include presenting an alert as an inline alert 306. The inline alert 306 is presented as a portion of window 304 that is presented before, after, or otherwise inline with the digital communication. Here, the inline alert 306 is presented as a banner across the top of the body of the email. The banner warns the user that the digital communication is potentially a threat. In this example, the body 308 of the email is displayed after the alert 306.

Figure 4:
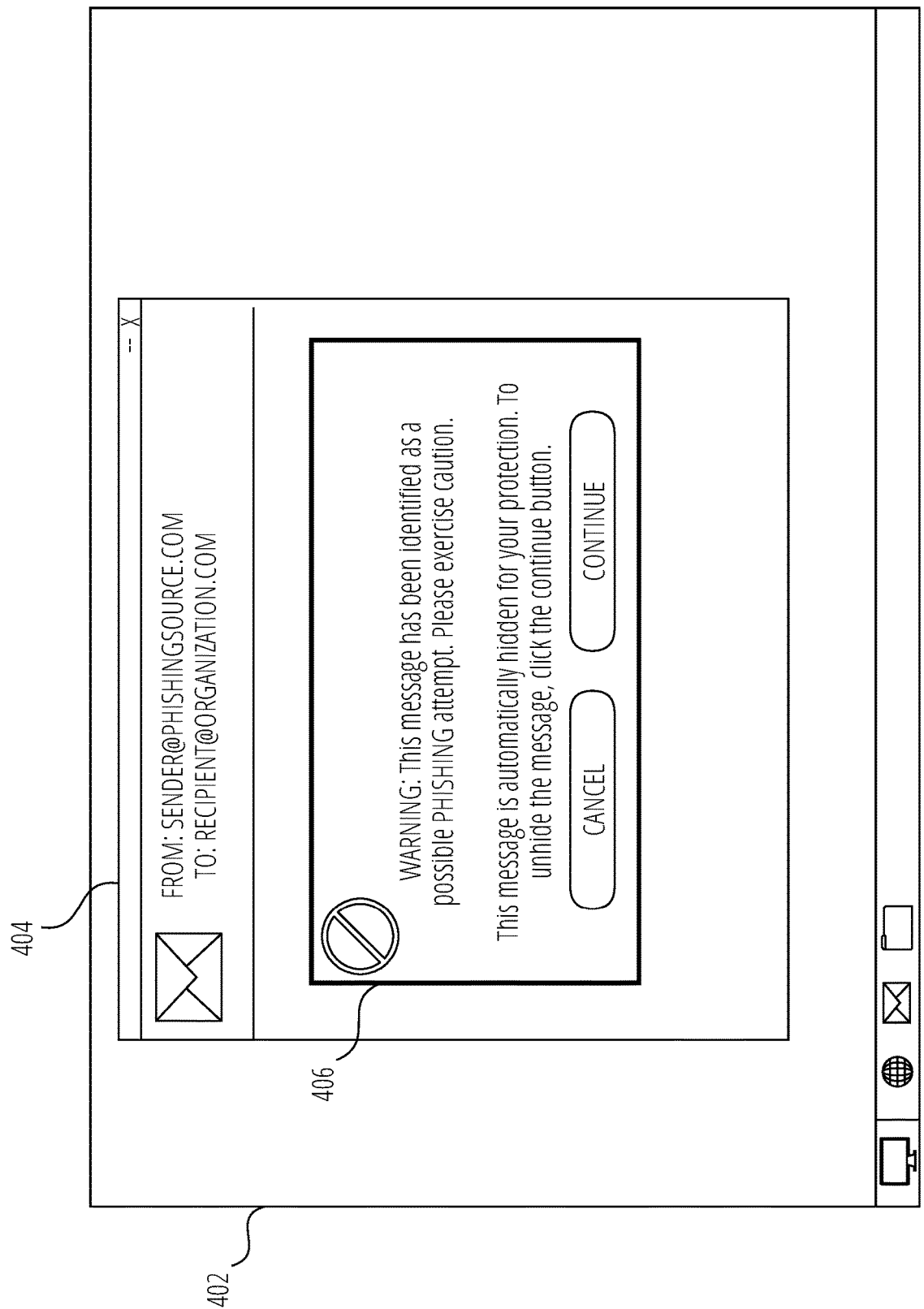
FIG. 4 is an illustration depicting a graphical user interface showing a second alert in conjunction with a suspected phishing threat, according to certain aspects of the present disclosure.

FIG. 4 is an illustration depicting a graphical user interface 402 showing a second alert 406 in conjunction with a suspected phishing threat, according to certain aspects of the present disclosure. The graphical user interface 402 can be implemented on any suitable device, such as a user device (e.g., user device 104 of FIG. 1).

The graphical user interface 402 can include a window 404 for displaying a received digital communication. The window 404 can be the same or similar to window 304 of FIG. 3.

In some cases, presenting an alert as described herein, such as described with reference to FIG. 1, can include presenting an alert as a modal alert 406. The modal alert 406 is presented before at least a portion of the digital communication is presented to the user. In the example of FIG. 4, the modal alert 406 is presented prior to presentation of the body of the digital communication.

The modal alert 406 can be presented in any suitable fashion, such as a separate window (e.g., a window on top of window 404) or a temporary replacement portion of a window (e.g., temporary replacement for the body of the email that would otherwise be displayed in window 404). The modal alert 406 can provide a warning to the user and give the user an opportunity to cancel or continue. By clicking on the appropriate button or taking any other requested action (e.g., typing in the word continue into a text box), the digital communication will either be displayed or not displayed. If the user selected cancel, the window 404 may close. If the user selects continue, the modal alert 406 may disappear and the body of the email may be shown in window 404. In some cases, after clicking the continue button or taking a similar action to view the digital communication, the system can present the digital communication along with a non-modal alert, such as an inline alert (e.g., alert 306 of FIG. 3) or other alert.

Figure 5:
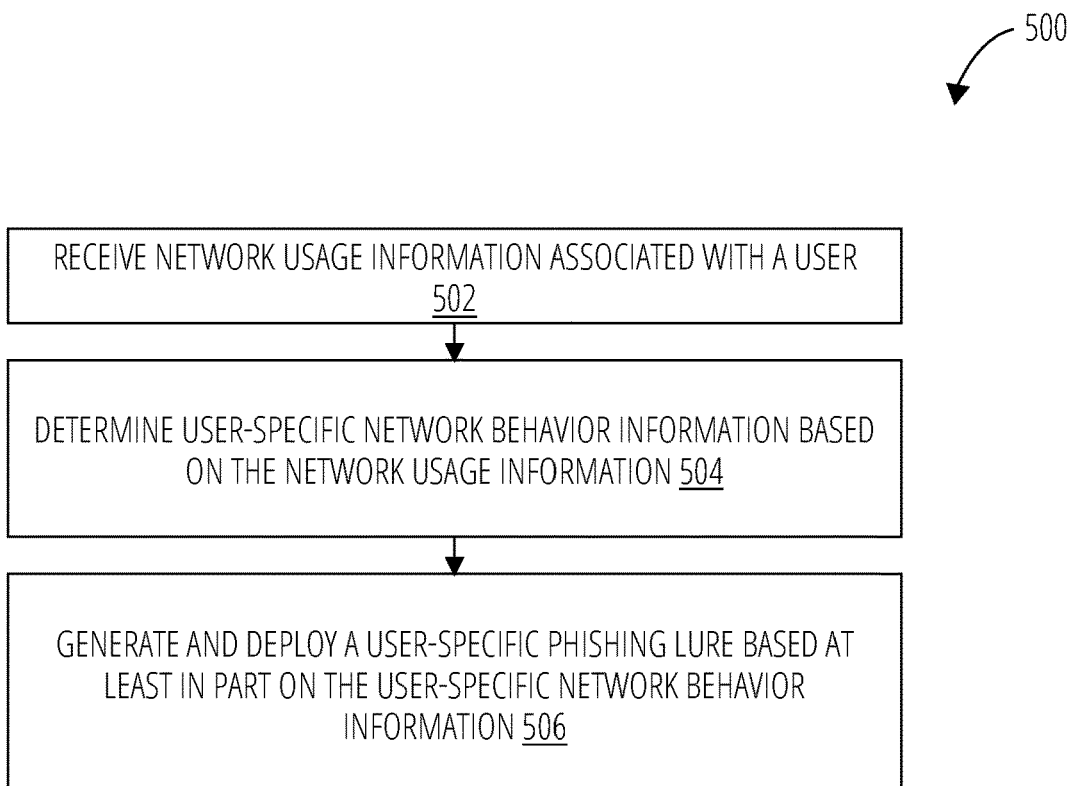
FIG. 5 is a flowchart depicting a process for generating user-specific phishing lures, according to certain aspects of the present disclosure.

FIG. 5 is a flowchart depicting a process 500 for generating user-specific phishing lures, according to certain aspects of the present disclosure. Process 500 can be performed using any suitable system, such as anti-phishing system 126 of FIG. 1.

At block 502, network usage information associated with a user is received. Receiving network usage information at block 502 can be similar to or the same as receiving network usage information at block 202 of FIG. 2.

At block 504, user-specific network behavior information can be determined. Determining the user-specific network behavior information at block 504 can be similar to or the same as determining user-specific network behavior information at block 204 of FIG. 2.

At block 506, a user-specific phishing lure can be generated and deployed. In some cases, generating and/or deploying a user-specific phishing lure can include one or more of the use of statistical techniques, application of neural networks, use of template matching, and the like.

Generating and deploying a user-specific phishing lure can include leveraging the user-specific network behavior information to generate and deploy a phishing lure that is specific to an asset used by the user and/or the user's past interactions with that asset. For example, if the user-specific network behavior information shows that the user appears to take less time reviewing an email from one of the assets in the set of assets before clicking on a hyperlink within the email later in the day on Thursdays and Fridays, the system can generate and deploy a user-specific phishing lure that purports to originate from a known asset and is delivered to the user late in the day on a Thursday or Friday. Thus, the user-specific phishing lure can be tailored to the user's specific practices.

In another example, if the user-specific network behavior information shows that the user regularly receives emails from their bank every Monday morning, the system can generate a user-specific phishing lure that purports to originate from that bank and that can be delivered to the user early on the following Monday morning, when the user may be expecting an authentic email from their bank.

In some cases, the user-specific network behavior information can be used in the generation of a user-specific phishing lure, such as generating a phishing lure that includes content designed to target the specific user. In some cases, the user-specific network behavior information can be used in the deployment of the user-specific phishing lure. In such cases, the user-specific network behavior information can be used to determine a targeted time or technique for delivering the phishing lure to the user. In some cases, the user-specific network behavior information can be used both in the generation and deployment of the user-specific phishing lure.

In some cases, deploying the user-specific phishing lure can include determining a target timing (e.g., time to deliver the phishing lure) based on the user-specific network behavior information. The target timing can be a time or time range in which (i) the user is expected to be using the user device; (ii) a legitimate digital communication (e.g., an authentic communication) is expected to be received by the user; or (iii) both (i) and (ii).

In some cases, generating the user-specific phishing lure can include generating content for the phishing lure based at least in part on the user-specific network behavior information. For example, the user-specific network behavior information can identify an asset used by the user and can establish a template for emails used by that asset, as described in further detail herein. The system can then generate a user-specific phishing lure using the template to thus create a new email that purports to originate from the asset. When using a template, certain content from the original digital communication can be replaced with generated content, such as date information and hyperlinks. In some cases, templates can be further edited by system administrators.

In some cases, generating the user-specific phishing lure is based at least in part on a received digital communication from an asset. For example, a previously received digital communication from a bank can be used to generate a phishing lure that purports to originate from that bank. In some cases, the user-specific phishing lure can be generated to appear to continue from or otherwise relate to content of the previously received digital communication. For example, if a previously received digital communication relates to opening a new account, the user-specific phishing lure can be generated to request the user click a hyperlink as part of setting up a feature of their new account. In some cases, the user-specific phishing lure can be generated and deployed in response to receiving the digital communication. In the above example, the phishing lure purporting to set up a feature of the new bank account can be automatically generated and deployed (e.g., immediately or after a delay) in response to the digital communication indicating the new account has been opened.

In some cases, generating and deploying a user-specific phishing lure at block 506 can include selecting an asset from of a set of assets to use for the user-specific phishing lure. The asset can be selected using any suitable criteria, such as frequency with which the user interacts with the asset (e.g., selecting assets with which the user most frequently interacts), harm if compromised (e.g., selecting assets that would cause the most harm if compromised), frequency of the asset being compromised (e.g., selecting assets that are popular targets for bad actors), and the like. Any suitable criteria can be used. In some cases, multiple criteria can be used with different weightings. In some cases, an organization can establish a priority list of assets to use. In some cases, selecting an asset can include adjusting the weightings, priority list of assets, or other aspects of the selection criteria based on geographical location (e.g., an asset accessed the most from US offices of an organization may not be accessed often from EU-based offices of the organization).

Process 500 is depicted with a set of blocks presented in a certain order. In some cases, process 500 can include fewer, additional, and/or alternate blocks, including in different orders.

For example, in some cases process 500 can include generating and storing a phishing simulation template associated with an asset based on the network usage information (e.g., based on previous digital communications associated with the asset). In some cases that phishing simulation template can be specific to the user and the asset. In some cases, the phishing simulation template can be stored along with template information. Such template information can include (i) information about the user (e.g., an identifier for the user); (ii) information about the asset (e.g., a name, domain, address, or other identifier for the asset); (iii) a time of delivery range (e.g., a time or range of time during which the phishing lure generated with this template should be delivered); (iv) a delivery frequency range (e.g., a frequency or frequency range for how often phishing lures generated with this template should be used, a frequency or frequency range for how often authentic communications from the asset associated with this template are sent); or (v) any combination of (i) to (iv).

In some cases, generating and deploying a user-specific phishing lure can include intercepting an authentic communication (e.g., an incoming bank statement) and generating and deploying a user-specific phishing lure intended to simulate the authentic communication (e.g., a phishing lure purporting to be an incoming bank statement). The intercepted authentic communication can be held for later delivery to the user, such as delivery after a set amount of time (e.g., 2 hours, 4 hours, 24 hours, etc.) or after the user has interacted with the user-specific phishing lure.

In some cases, portions of process 500 can be integrated into portions of one or more other processes described herein.

Figure 6:
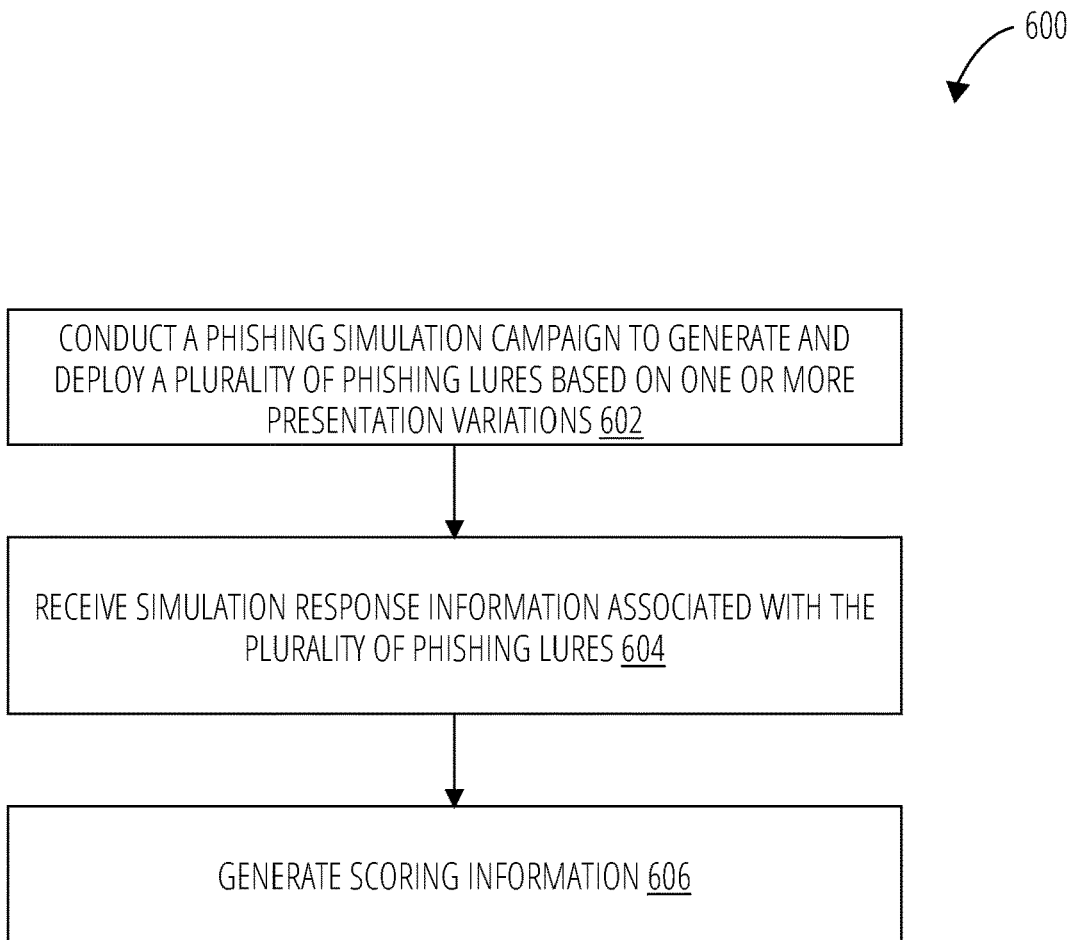
FIG. 6 is a flowchart depicting a process for evaluating a phishing simulation campaign, according to certain aspects of the present disclosure.

FIG. 6 is a flowchart depicting a process for evaluating a phishing simulation campaign, according to certain aspects of the present disclosure. Process 600 can be performed using any suitable system, such as anti-phishing system 126 of FIG. 1.

At block 602, a phishing simulation campaign can be conducted. Conducting the phishing simulation campaign can include generating and deploying phishing lures (e.g., user-specific phishing lures based on user-specific network behavior information, such as described with reference to FIG. 5) to one or more users (e.g., multiple users of an organization).

In some cases, the phishing lures generated and deployed at block 602 can be generated and/or deployed using one or more presentation variations. Presentation variations are variations in different aspects of how phishing lure, which can stem from the same primary content, are generated and/or deployed. These variations cause the resultant phishing lures to be presented to the user(s) in slightly different ways or be generated with slightly different content. Example presentation variations include (i) variation in the specific text used (e.g., slight variations in word choice or variations in names from the same primary content); (ii) variation in one or more images (e.g., use of different images or logos); (iii) variation in text quality (e.g., changes to the spelling or grammar of the text content, such as introduction of spelling, grammatical, or capitalization errors); (iv) variation in image quality (e.g., use of images with low resolutions, errors, or other quality deficiencies); (v) variation in formatting (e.g., use of different fonts, font sizes, character/word/line/paragraph spacing, and the like); (vi) variation in timing (e.g., delivering the phishing lure at different times or relative times); or (vii) any combination of (i) to (vi).

In some cases, implementing presentation variations that include variation in timing can include identifying a timing variation, determining a first time to deploy a phishing lure to a user, determining a second time to deploy a second phishing lure to a user based on the first time and the timing variation, deploying the first phishing lure at the first time, and deploying the second phishing lure at the second time. For example, a timing variation can range from 5 minutes to 10 days. For a first user or set of users, first and second phishing lures can be deployed five minutes apart, and for a second set of users, first and second phishing lures can be deployed 10 days apart. Other timing variations can be used, as well as additional numbers of different variations for the timing variations (e.g., three, four, five, or more different timing variations used). Thus, scoring information can indicate if a second phishing lure is more or less effective if it is sent 5 minutes after a first phishing lure versus 10 days after a first phishing lure.

The use of presentation variations can allow the system to identify which presentation variations work better than others. Depending on who is targeted in the campaign and how many phishing lures are sent to each user during the campaign, the system may be able to identify which presentation variations work better than others globally, for a given organization, for a given group of users, and/or for a specific user.

In an example, for a phishing lure purporting to originate from a bank, the primary content of the phishing lure may be a request for the user to click a link to sign into their bank account to correct an error. The same primary content can be used to generate a collection of phishing lures spanning multiple presentation variations. Phishing lures generated with a first presentation variation may appear with several misspelled words and/or grammatical errors. Phishing lures generated with a second presentation variation may appear with low-resolution images and logos. Phishing lures generated with a third presentation variation may appear with a different purported sender (e.g., a different reply-to address).

At block 604, simulation response information associated with the phishing lures generated and deployed at block 602 is received. The simulation response information is information indicative of how users acted in response to receiving the phishing lures. For example, the simulation response information can include information about positive response actions, negative response actions, and optionally neutral response actions.

For example, if a user clicks on a hyperlink in the phishing lure, that action may cause a signal to be received that indicates that user fell victim to the phishing lure. The simulation response information can include summary information (e.g., total number of negative response actions) or specific information with any suitable degree of granularity (e.g., an indication that a particular user fell victim to a particular phishing lure, optionally including what action the user took and additional information about the phishing lure, such as which presentation variations were used, if any).

At block 606, scoring information can be generated for the phishing simulation campaign. The scoring information can be generated based at least in part on the simulation response information. The scoring information can indicate how one or more users and/or the organization performed with respect to the phishing simulation campaign. For example, a high score can indicate the user, group of users, or organization is not very susceptible to phishing attacks, whereas a low score can indicate the user, group of users, or organization is susceptible to phishing.

In some cases, the scoring information can be further based on the presentation variation(s) from block 602. In such cases, the scoring information can include scores or sub-scores indicating how different presentation variations performed. For example, a presentation variation with a high sub-score can indicate that the presentation variation is more effective at convincing users to take action than one with a low score.

In some cases, additional information about the phishing lures and/or simulation response information can be leveraged to further generate scoring information for combinations of users, presentation variations, actions taken by users (e.g., what actions the users take in response to receiving the phishing lure), and/or other such factors. For example, the simulation response information and presentation variations can be used to generate scoring information (e.g., scores or sub-scores) for each combination of presentation variation and action taken by users. For example, such scoring information can identify that certain presentation variations are especially high-performing for convincing users to click on a hyperlink, whereas other presentation variations are especially high-performing for convincing users to reply to an email.

Process 600 is depicted with a set of blocks presented in a certain order. In some cases, process 600 can include fewer, additional, and/or alternate blocks, including in different orders. For example, in some cases, the plurality of phishing lures are generated and deployed at block 602 without actively implementing specific presentation variations (e.g., instead relying on presentation variations that naturally occur due to how the phishing lures are generated and deployed). In such cases, generating scoring information at block 606 can include analyzing the each phishing lure to identify if any presentation variations are present in the phishing lure, then generating the scoring information using those identified presentation variations.

In some cases, process 600 or portions thereof can be initiated on demand or can be automatically scheduled (e.g., on a repeated ongoing basis). In some cases, automatic scheduling of process 600 or portions thereof can be specific for each user, such as based on user-specific network behavior information or user environment information as disclosed in further detail herein. For example, for a user who is especially susceptible to phishing threats, the system may more regularly generate and deploy phishing lures to that user than for another use who is not as susceptible to phishing threats.

In some cases, automatic scheduling of process 600 or portions thereof can be based on organizational decisions, such as decisions to increase or decrease security priorities. For example, if an organization decides that they want to prioritize anti-phishing approaches more, they may update a setting that causes the system to automatically schedule process 600 to occur more often.

In some cases, automatic scheduling of process 600 or portions thereof can be based on evolving user behavior. For example, user-specific network behavior information can be monitored and it can be determined that one or more users are starting to access new websites associated with a new asset or receive digital communications from a new asset. In such cases, the system may automatically schedule process 600 or portions thereof to occur in response to this determination to generate and deploy one or more phishing lures specific to the new asset. For example, if many users suddenly start receiving recurring emails from a new SaaS provider (e.g., a provider of a new, cloud-based collaboration tool), the anti-phishing system may detect those new incoming digital communications from the new asset and initiate a phishing simulation campaign using templates derived from the received digital communications from the new SaaS provider, thus providing users with timely, specific training associated with the new asset.

In some cases, process 600 can include generating training recommendations for a user based on scoring information. For example, if the scoring information shows that a particular user has been susceptible to multiple phishing lures in a particular way (e.g., clicking on a hyperlink or taking another specific action, or when the phishing lure contained certain content), the system can generate a training recommendation to train that user according to the particular way they fell victim to the phishing lure(s). In some cases, the training recommendation can be specific to the phishing lure(s) received by the user and/or to which the user fell victim.

In some cases, portions of process 600 can be integrated into portions of one or more other processes described herein.

Figure 7:
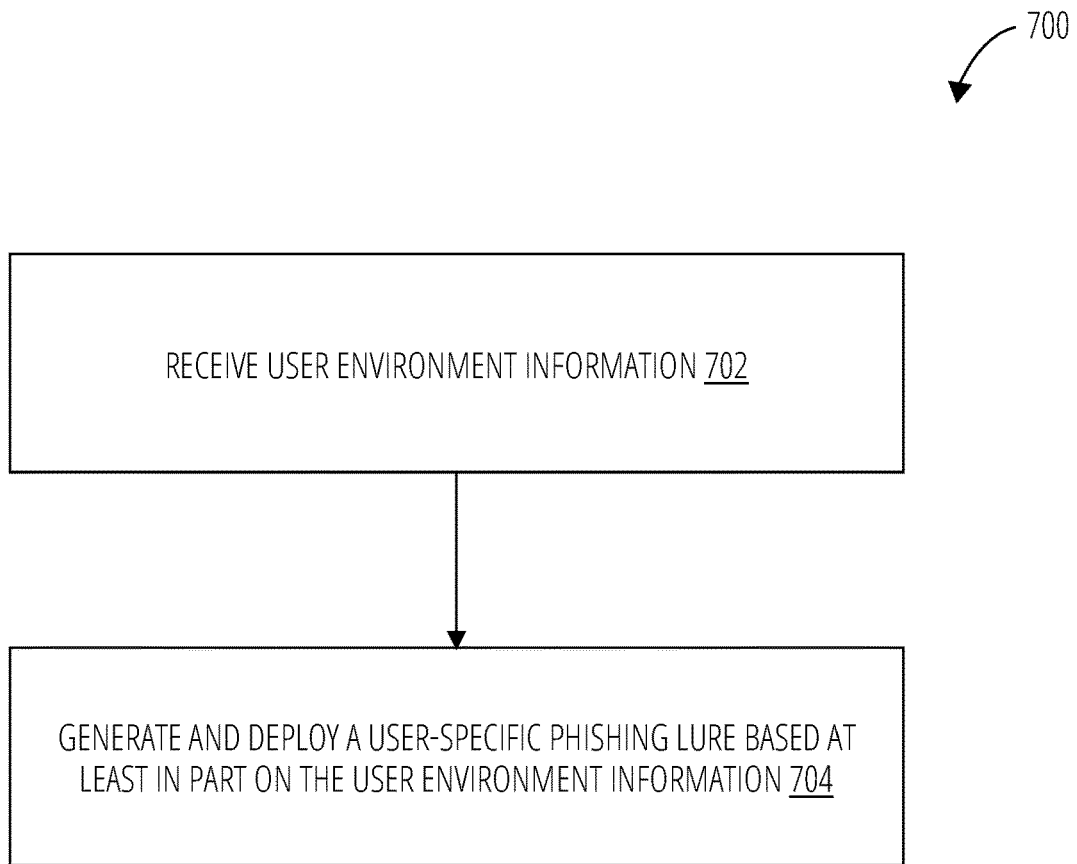
FIG. 7 is a flowchart depicting a process for generating user-specific phishing lures from user environment information, according to certain aspects of the present disclosure.

FIG. 7 is a flowchart depicting a process for generating user-specific phishing lures from user environment information, according to certain aspects of the present disclosure. Process 700 can be performed using any suitable system, such as anti-phishing system 126 of FIG. 1.

At block 702, user environment information can be received. User environment information can be information regarding the computer environment in use by the user. For example, user environment information can include information about the type of device being used by the user, the brand of device, the model of device, the operating system running by the user, information about when the user accesses the device, information about programs used by the user, other usage patterns related to the user using the user device, and the like. Some further examples of user environment information include (i) time ranges when the user is typically using the user device, such as based on machine logs; (ii) time of use of specific applications; (iii) user browsing history as available locally (e.g., as collected by the user device); (iv) level of user input (e.g., keyboard, mouse, etc.) activity to infer how the user is making use of the user device (e.g., whether the user is creating content, such as drafting emails, or consuming content, such as reading emails).

User environment information can be collected by an agent running on the user's user device. For example, a background process can run on the user's user device that collects user environment information and passes it to the anti-phishing system. In an example, a business may provide user devices to its employees with the agent software preinstalled as part of a standard installation. Thus, as the employees use the user devices for work, the user environment information is collected and passed to the anti-phishing system for further use.

At block 704, one or more user-specific phishing lures can be generated and deployed based at least in part on the user environment information. Generating and deploying a user-specific phishing lure can include leveraging the user environment information to generate and deploy a phishing lure that is specific to the user's user environment. For example, if the user environment information shows that the user regularly accesses their user device each morning at 8 am, the system may generate a user-specific phishing lure that is deployed to the user at or near 8 am, thus intending to arrive when the user is expected to be using their device. In another example, if the user environment information shows that the user is typically consuming content instead of creating content at particular times of the day or after taking particular actions (e.g., accessing particular websites or sending particular outgoing digital communications), the anti-phishing system can deploy a phishing lure at those particular times of the day when the user is more likely to see the incoming digital communication.

In some cases, a user-specific phishing lure can be generated using user environment information. For example, information about the type/brand/model of device used by the user, operating system running on the user device, or software being used by the user can be used to generate a customized phishing lure specific to that type/brand/model of device, operating system, and/or software. For example, if the user environment information shows that the user often uses a particular computer-aided design (CAD) program and is using a particular model of computer, the system may generate a user-specific phishing lure that purports to include a hyperlink to an updated version of the CAD program or a security patch specific to the user's particular model of computer.

In some cases, the user environment information can be used in the generation of a user-specific phishing lure, such as generating a phishing lure that includes content designed to target the specific user's user environment. In some cases, the user environment information can be used in the deployment of the user-specific phishing lure. In such cases, the user environment information can be used to determine a targeted time or technique for delivering the phishing lure to the user. In some cases, the user environment information can be used both in the generation and deployment of the user-specific phishing lure.

Process 700 is depicted with a set of blocks presented in a certain order. In some cases, process 700 can include fewer, additional, and/or alternate blocks, including in different orders.

In some cases, portions of process 700 can be integrated into portions of one or more other processes described herein. For example, in some cases process 700 can be integrated into process 500 to generate and deploy a user-specific phishing lure that is based at least in part on user-specific network behavior information and based at least in part on user environment information.

Figure 8:
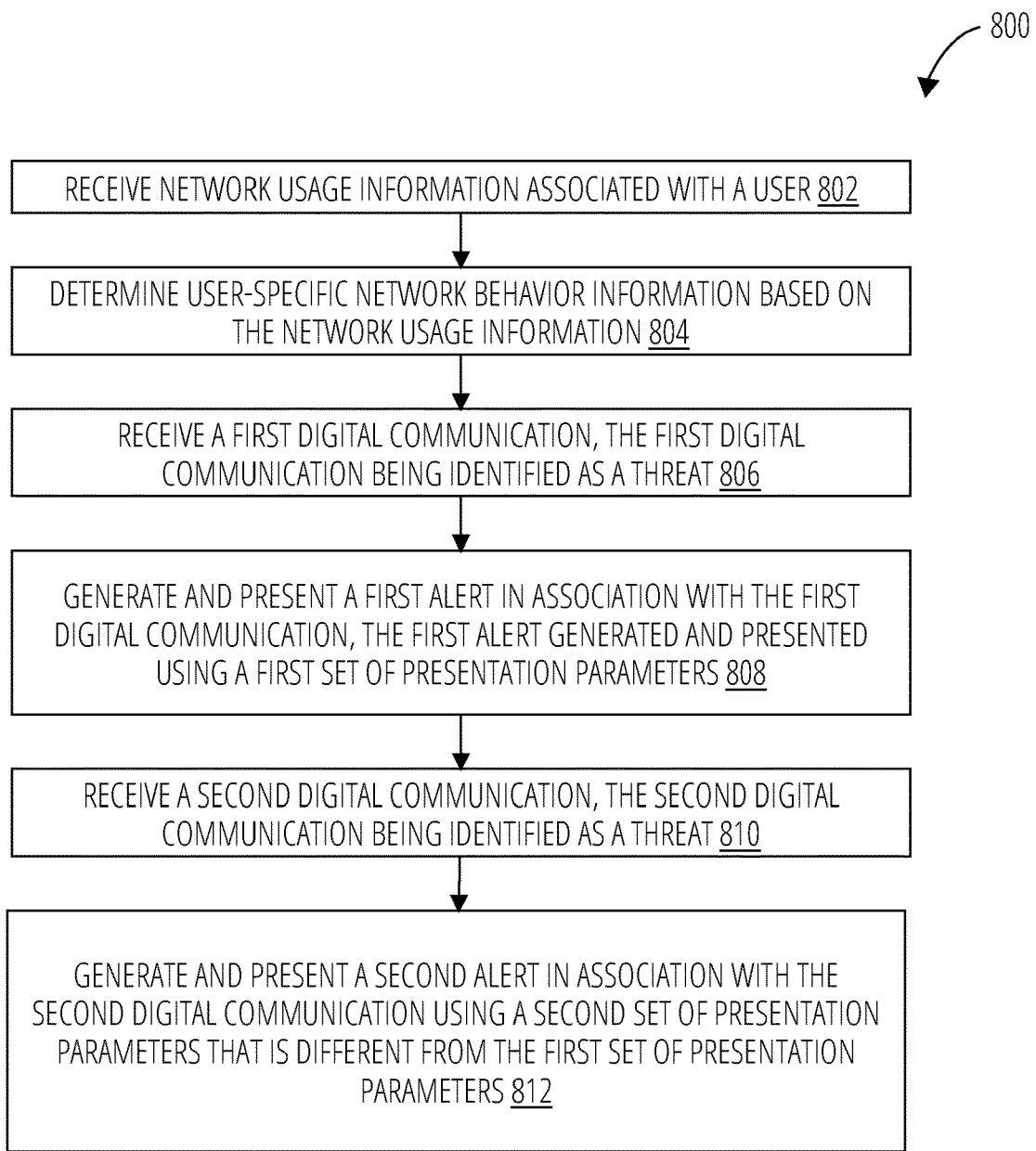
FIG. 8 is a flowchart depicting a process for generating dynamic threat alerts, according to certain aspects of the present disclosure.

FIG. 8 is a flowchart depicting a process for generating dynamic threat alerts, according to certain aspects of the present disclosure. Process 800 can be performed using any suitable system, such as anti-phishing system 126 of FIG. 1.

At block 802, network usage information associated with a user is received. Receiving network usage information at block 802 can be similar to or the same as receiving network usage information at block 202 of FIG. 2.

At block 804, user-specific network behavior information can be determined. Determining the user-specific network behavior information at block 804 can be similar to or the same as determining user-specific network behavior information at block 204 of FIG. 2.

At block 806, a first digital communication can be received. This first digital communication can be identified as a threat. In some cases, the first digital communication can be received along with metadata already identifying the digital communication as a threat. In other cases, the first digital communication can be received and analyzed to determine whether or not it is a threat (e.g., such as in process 200 of FIG. 2).

At block 808, a first alert is generated and presented in association with the first digital communication. Generating and presenting an alert can occur similar to or the same as described with reference to process 200 of FIG. 2. This first alert can indicate to the user that the first digital communication is a threat (e.g., is a phishing attempt). This first alert can be presented using a first set of presentation parameters.

Presentation parameters are parameters that define how an alert is presented to a user. Examples of presentation parameters include (i) a color parameter; (ii) a font parameter; (iii) a size parameter; (iv) a format parameter; (v) a position parameter; (vi) an image parameter; (vii) an alert modality parameter; (viii) an alert type parameter; or (ix) any combination of (i)-(viii). Other parameters can be used.

In some cases, presentation parameters includes a content parameter that affects what content is used to distinguish the alert (e.g., an alert that says "Warning, this email appears to be a phishing attempt. Please use caution." versus an alert that says "WARNING, this email appears to contain malicious material. DO NOT click any links or download any attachments without first confirming the authenticity of the email.").

At block 810, a second digital communication can be received. This second digital communication can be identified as a threat. In some cases, the second digital communication can be received along with metadata already identifying the digital communication as a threat. In other cases, the second digital communication can be received and analyzed to determine whether or not it is a threat (e.g., such as in process 200 of FIG. 2).

At block 812, a second alert is generated and presented in association with the second digital communication. The second alert can be presented using a second set of presentation parameters. This second set of presentation parameters can be different than the first set of presentation parameters.

In some cases, block 812 includes making a decision to present the second alert using a second set of presentation parameters instead of the first set of presentation parameters. Such a decision can be made with the goal of providing a more effective alert to the user.

In some cases, a decision can be made to present the second alert using the second set of presentation parameters instead of the first set of presentation parameters based at least in part on the user-specific network behavior information and/or results from a prior phishing simulation campaign. For example, for users who perform poorly in a phishing simulation campaign, a second set of presentation parameters can be used that more specifically call out the email as a threat and/or that stop the user from opening the email until the user confirms the alert.

In some cases, the decision to present the second alert using the second set of presentation parameters can be based solely on the number of alerts presented to a user using the first set of presentation parameters and/or a set amount of time alerts have been presenting using the first set of presentation parameters. For example, a user may be presented with alerts using the first set of presentation parameters for a month, after which subsequent alerts will be presented using a second set of presentation parameters. In another example, a user may be presented with alerts using the first set of presentation parameters for a preset number of alerts (e.g., 30 alerts), after which subsequent alerts will be presented using a second set of presentation parameters. In this fashion, the over familiarization with any given alert can be combatted by adjusting how future alerts are presented.

In an example, the first alert at block 808 is presented as an inline alert (e.g., inline alert 306 of FIG. 3) and the second alert at block 812 is presented as a modal alert (e.g., modal alert 406 of FIG. 4).

In some cases, process 800 can include receiving first alert outcome information. This first alert outcome information can be information indicative of how the user responded to the first digital communication. For example, if the user clicked on a hyperlink in the first digital communication, the system may identify that the first alert did not perform well, at least for that user. This information can be leveraged to decide to generate and present the second alert using the second set of presentation parameters with the goal of providing a more effective alert that will not result in the user clicking on a hyperlink in the second digital communication. In some cases, process 800 can include receiving additional network usage information after block 808. Such additional network usage information can be used to determine the first alert outcome information. For example, the network usage information can indicate that the user attempted to access a domain associated with the first digital communication In some cases, block 812 includes selecting the second set of presentation parameters. In some cases, selecting the second set of presentation parameters includes choosing one or more presentation parameters based on the first set of presentation parameters to ensure at least one of the presentation parameters is changed. In some cases, selecting the second set of presentation parameters can include determining one or more changes to the first set of presentation parameters. In some cases, the changes can be determined based on past alert outcome information associated with one or more sets of presentation parameters. For example, if it is determined that adjusting the images used in the alerts has provided improvements in alert outcome in the past, selecting the second set of presentation parameters can include making the same or similar adjustments to the images from the first set of presentation parameters.

Process 800 is depicted with a set of blocks presented in a certain order. In some cases, process 800 can include fewer, additional, and/or alternate blocks, including in different orders.

While process 800 is described with reference to digital communications identified as threats, in some cases process 800 can be performed using phishing lures that have been generated to appear as threats. For example, the first digital communication can be a first phishing lure and first alert outcome information can be collected and used to determine that the second set of presentation parameters should be used in subsequent alerts. The subsequent alerts can be for a phishing lure or an actual identified threat.

In some cases, portions of process 800 can be integrated into portions of one or more other processes described herein.

Figure 9:
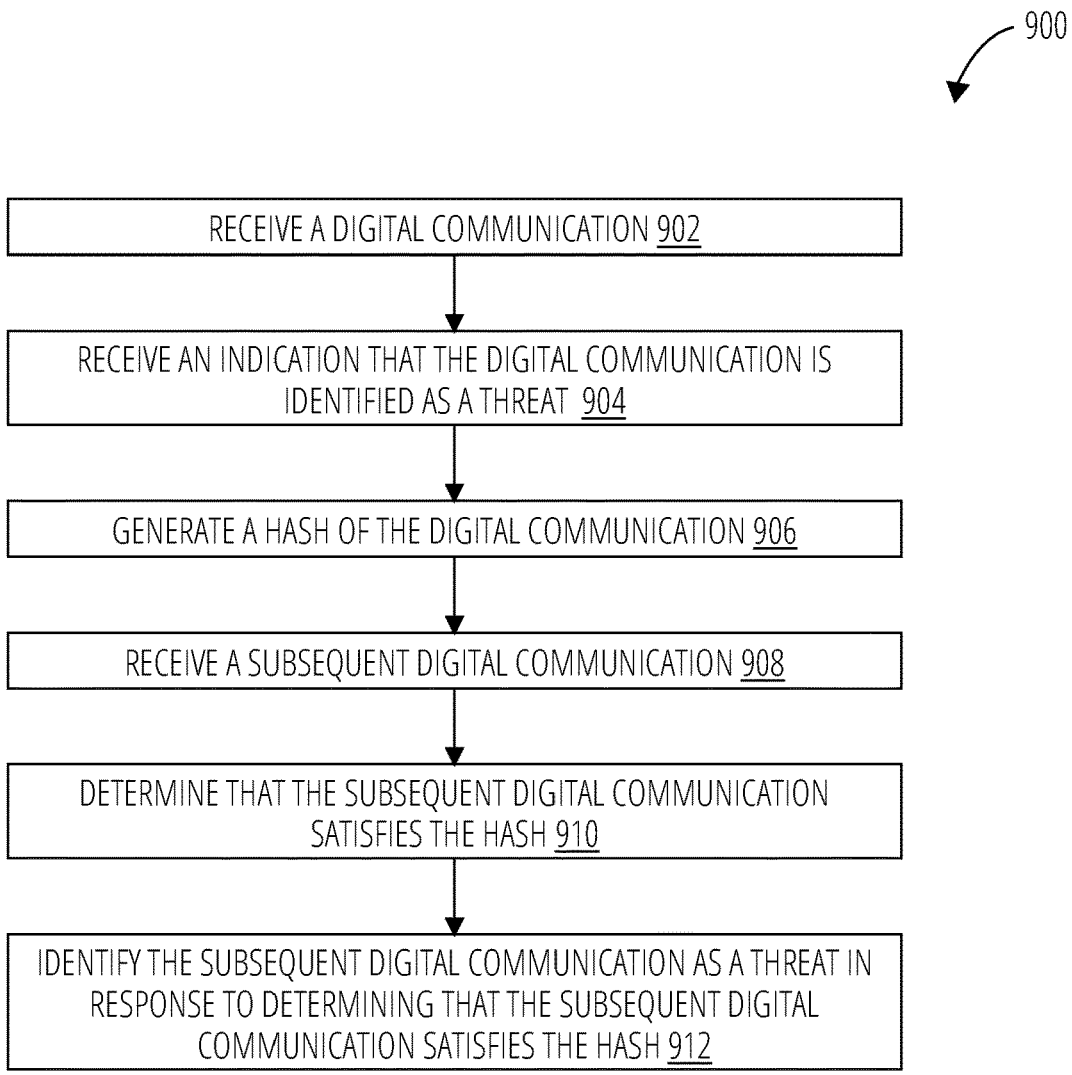
FIG. 9 is a flowchart depicting a process for rapid threat identification, according to certain aspects of the present disclosure.

FIG. 9 is a flowchart depicting a process for rapid threat identification, according to certain aspects of the present disclosure. Process 900 can be performed using any suitable system, such as anti-phishing system 126 of FIG. 1.

At block 902, a digital communication can be received. Receiving a digital communication can occur using any suitable technique.

At block 904, an indication that the digital communication is a threat is received. Receiving the indication that the digital communication is a threat can include receiving metadata associated with the digital communication indicating that the digital communication is a threat In some cases, receiving the indication that the digital communication is a threat can include analyzing the digital communication to determine whether or not it is a threat (e.g., such as in process 200 of FIG. 2).

At block 906, a hash of the digital communication can be generated. Generating a hash of the digital communication can include generating applying some or all of the digital communication to a hashing algorithm to generate the hash.

In some cases, only certain portions of the digital communication are used to generate the hash. In some cases, the portions used can be preset, such as the domain of the sending address, the beginning of the body of an email (e.g., the first line or two of the body of the email, optionally with the recipient's name removed, such as "Greetings dear customer _____, Our bank has identified you as . . . "), an end portion of the body of an email (e.g., a signature line or lines), and the like. In some cases, the portions used can be automatically identified through analysis of multiple digital communications identified as threats. For example, common language found in multiple phishing threats can be used to generate the hash.

At block 908, a subsequent digital communication can be received. Receiving the subsequent digital communication at block 908 can be similar to receiving the digital communication at block 902.

At block 910, a determination can be made that the subsequent digital communication satisfies the hash from block 906. This determination can include applying the same hashing algorithm to some or all of the subsequent digital communication and comparing the resulting hash with the hash from block 906. In some cases, the portions of the subsequent digital communication used to generate the hash can be the same as those used with the digital communication to generate the hash at block 906. Any other suitable technique for matching the subsequent digital communication to the hash can be used.

At block 912, in response to determining that the subsequent digital communication satisfies the hash from block 906, the subsequent digital communication can be identified as a threat. For example, if one or more initial digital communications are identified as threats via a separate process, such as process 200 of FIG. 2, a hash can be generated to quickly identify subsequent digital communications that are likely threats without necessarily needing to perform another iteration of process 200 on the subsequent digital communications.

Process 900 is depicted with a set of blocks presented in a certain order. In some cases, process 900 can include fewer, additional, and/or alternate blocks, including in different orders. In some cases, portions of process 900 can be integrated into portions of one or more other processes described herein.

FIG. 10 is a block diagram of an example system architecture 1002 for implementing features and processes of the present disclosure, such as those presented with reference to processes 200, 500, 600, 700, 800, 900 of FIGS. 2, 5, 6, 7, 8, 9, respectively. The features and processes disclosed herein can be implemented using one or multiple instances of system architecture 1002. The system architecture 1002 can be used to implement a server (e.g., a cloud-accessible server), a user device (e.g., a smartphone or personal computer), or any other suitable device for performing some or all of the aspects of the present disclosure. The system architecture 1002 can be implemented on any electronic device that runs software applications derived from compiled instructions, including without limitation personal computers, servers, smart phones, electronic tablets, game consoles, email devices, and the like. In some implementations, the system architecture 1002 can include one or more processors 1006, one or more input devices 1014, one or more display devices 1012, one or more network interfaces 1010, and one or more computer-readable media 1022. Each of these components can be coupled by bus 1020.

Display device 1012 can be any known display technology, including but not limited to display devices using Liquid Crystal Display (LCD) or Light Emitting Diode (LED) technology. Processor(s) 802 can use any known processor technology, including but not limited to graphics processors and multi-core processors. Input device 1014 can be any known input device technology, including but not limited to a keyboard (including a virtual keyboard), mouse, track ball, and touch-sensitive pad or display. In some cases, audio inputs can be used to provide audio signals, such as audio signals of an individual speaking. Bus 1020 can be any known internal or external bus technology, including but not limited to ISA, EISA, PCI, PCI Express, NuBus, USB, Serial ATA or FireWire.

Computer-readable medium 1022 can be any medium that participates in providing instructions to processor 1006 for execution, including without limitation, non-volatile storage media (e.g., optical disks, magnetic disks, flash drives, etc.) or volatile media (e.g., SDRAM, ROM, etc.). The computer-readable medium (e.g., storage devices, mediums, and memories) can include, for example, a cable or wireless signal containing a bit stream and the like. However, when mentioned, non-transitory computer-readable storage media expressly exclude media such as energy, carrier signals, electromagnetic waves, and signals per se.

Computer-readable medium 1022 can include various instructions for implementing operating system 1016 and applications 1018 such as computer programs. The operating system 1016 can be multi-user, multiprocessing, multitasking, multithreading, real-time and the like. The operating system 1016 performs basic tasks, including but not limited to: recognizing input from input device 1014; sending output to display device 1012; keeping track of files and directories on computer-readable medium 1022; controlling peripheral devices (e.g., storage drives, interface devices, etc.) which can be controlled directly or through an I/O controller; and managing traffic on bus 1020. Computer-readable medium 1022 can include various instructions for implementing firmware processes, such as a BIOS. Computer-readable medium 1022 can include various instructions for implementing any of the processes described herein, including at least processes 200, 500, 600, 700, 800, 900 of FIGS. 2, 5, 6, 7, 8, 9, respectively.

Memory 1008 can include high-speed random access memory and/or non-volatile memory, such as one or more magnetic disk storage devices, one or more optical storage devices, and/or flash memory (e.g., NAND, NOR). The memory 1008 (e.g., computer-readable storage devices, mediums, and memories) can include a cable or wireless signal containing a bit stream and the like. However, when mentioned, non-transitory computer-readable storage media expressly exclude media such as energy, carrier signals, electromagnetic waves, and signals per se. The memory 1008 can store an operating system, such as Darwin, RTXC, LINUX, UNIX, OS X, WINDOWS, or an embedded operating system such as VxWorks.

System controller 1004 can be a service processor that operates independently of processor 1006. In some implementations, system controller 1004 can be a baseboard management controller (BMC). For example, a BMC is a specialized service processor that monitors the physical state of a computer, network server, or other hardware device using sensors and communicating with the system administrator through an independent connection. The BMC is configured on the motherboard or main circuit board of the device to be monitored. The sensors of a BMC can measure internal physical variables such as temperature, humidity, power-supply voltage, fan speeds, communications parameters and operating system (OS) functions.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computing system that includes a back-end component, such as a data server, or that includes a middleware component, such as an application server or an Internet server, or that includes a front-end component, such as a client computer having a graphical user interface or an Internet browser, or any combination thereof. The components of the system can be connected by any form or medium of digital data communication such as a communication network. Examples of communication networks include, e.g., a LAN, a WAN, and the computers and networks forming the Internet.

The computing system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an application programming interface (API). An API can define one or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, and the like.

The foregoing description of the embodiments, including illustrated embodiments, has been presented only for the purpose of illustration and description and is not intended to be exhaustive or limiting to the precise forms disclosed. Numerous modifications, adaptations, and uses thereof will be apparent to those skilled in the art. Numerous changes to the disclosed embodiments can be made in accordance with the disclosure herein, without departing from the spirit or scope of the disclosure. Thus, the breadth and scope of the present disclosure should not be limited by any of the above described embodiments.

Although certain aspects and features of the present disclosure have been illustrated and described with respect to one or more implementations, equivalent alterations and modifications will occur or be known to others skilled in the art upon the reading and understanding of this specification and the annexed drawings. In addition, while a particular feature may have been disclosed with respect to only one of several implementations, such feature may be combined with one or more other features of the other implementations as may be desired and advantageous for any given or particular application.

The terminology used herein is for the purpose of describing particular embodiments only, and is not intended to be limiting of the disclosure. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

One or more elements or aspects or steps, or any portion(s) thereof, from one or more of any of the claims below can be combined with one or more elements or aspects or steps, or any portion(s) thereof, from one or more of any of the other claims below or combinations thereof, to form one or more additional implementations and/or claims of the present disclosure.

As used below, any reference to a series of implementations is to be understood as a reference to each of those implementations disjunctively (e.g., "Implementations 1-4" or "Implementations 1 to 4" is to be understood as "Implementation 1, 2, 3, or 4").

Implementation 1 is a computer-implemented method, comprising: receiving network usage information associated with a user; determining user-specific network behavior information based on the network usage information, the user-specific network behavior information indicative of how the user has interacted with a set of assets; receiving a digital communication; identifying the digital communication as being associated with at least one asset of the set of assets; and determining that the digital communication is a threat based at least in part on the user-specific network behavior information associated with the at least one asset of the set of assets; and employing a threat-abatement procedure with respect to the digital communication.

Implementation 2 is the computer-implemented method of implementation(s) 1, wherein determining the user-specific network behavior information includes: identifying a set of assets accessed by the user based at least in part on the network usage information; and determining user-asset activity data associated with the user interacting with the set of assets, wherein determining the user-asset activity data includes, for each asset of the set of assets, determining interaction data between the user and the respective asset based at least in part on the network usage information, the interaction data indicative of one or more interactions between the user and the asset.

Implementation 3 is the computer-implemented method of implementation(s) 2, wherein determining the user-specific network behavior information includes determining, for each of the set of assets, an access frequency associated with the respective asset, wherein determining that the digital communication is a threat is based at least in part on the access frequency.

Implementation 4 is the computer-implemented method of any one of implementation(s)s 1 to 3, wherein each the set of assets is a network-accessible asset that accepts user credentials.

Implementation 5 is the computer-implemented method of implementation(s) 4, wherein the set of assets includes at least one Internet-accessible website and at least one Internet-accessible software-as-a-service (SAAS) product.

Implementation 6 is the computer-implemented method of any one of implementation(s)s 1 to 5, wherein employing the threat-abatement procedure includes: generating an alert indicative that the digital communication is identified as a threat; and presenting the alert to the user.

Implementation 7 is the computer-implemented method of implementation(s) 6, wherein generating the alert includes determining, based at least in part on the user-specific network behavior information, user-specific reasoning for why the digital communication is identified as a threat, and wherein presenting the alert to the user includes presenting the user-specific reasoning.

Implementation 8 is the computer-implemented method of implementation(s) 7, wherein the user-specific network behavior information includes web browsing activity data associated with the user accessing a website associated with the at least one asset of the set of assets, and wherein determining the user-specific reasoning is based at least in part on the web browsing activity data.

Implementation 9 is the computer-implemented method of any one of implementation(s)s 6 to 8, wherein presenting the alert to the user includes presenting a banner in association with the digital communication.

Implementation 10 is the computer-implemented method of implementation(s) 9, wherein presenting the banner in association with the digital communication includes (i) inserting the banner in the body of an email; (ii) presenting the banner inline with a message; (iii) presenting the banner in an alert window; or (iv) any combination of (i), (ii), and (iii).

Implementation 11 is the computer-implemented method of any one of implementation(s)s 6 to 10, wherein presenting the alert to the user includes presenting a modal alert before presenting the digital communication, the modal alert including an option to continue without presenting the digital communication.

Implementation 12 is the computer-implemented method of any one of implementation(s)s 1 to 11, further comprising generating an interaction fingerprint associated with the at least one asset of the set of assets based at least in part on the user-specific network behavior information associated with the at least one asset of the set of assets, wherein determining that the digital communication is a threat includes determining that the digital communication does not fit the interaction fingerprint.

Implementation 13 is the computer-implemented method of implementation(s) 12, wherein generating the interaction fingerprint includes determining, based at least in part on timestamp information associated with a plurality of interactions associated with the at least one asset of the set of assets, at least one of (i) an acceptable timing range for interactions with the at least one asset of the set of assets, and (ii) an acceptable frequency range between interactions with the at least one asset of the set of assets; and wherein determining that the digital communication does not fit the interaction fingerprint includes determining that a timing of the digital communication falls outside of the acceptable timing range and/or falls outside of the acceptable frequency range with respect to a prior digital communication associated with the at least one asset of the set of assets.

Implementation 14 is the computer-implemented method of implementation(s) 12 or 13, further comprising: receiving an additional digital communication associated with the at least one asset of the set of assets; determining that the additional digital communication is not a threat; and updating the interaction fingerprint based at least in part on the additional digital communication.

Implementation 15 is the computer-implemented method of any one of implementation(s)s 1 to 14, wherein determining the user-specific network behavior information includes: determining first interaction data indicative of how the user has interacted with the at least one asset of the set of assets; and determining second interaction data indicative of how the user has interacted with a second asset of the set of assets, the second asset not included in the at least one asset of the set of assets; and wherein determining that the digital communication is a threat is based at least in part on the first interaction data and the second interaction data.

Implementation 16 is the computer-implemented method of implementation(s) 15, wherein determining that the digital communication is a threat includes comparing the first interaction data with the second interaction data.

Implementation 17 is the computer-implemented method of implementation(s) 15 or 16, further comprising: modifying a first threat-identification setting to adjust a first security response associated with a first asset of the set of assets based at least in part on the first interaction data; and modifying a second threat-identification setting to adjust a second security response associated with a second asset of the set of assets based at least in part on the second interaction data, wherein the first security response and the second security response are different.

Implementation 18 is the computer-implemented method of any one of implementation(s)s 1 to 17, further comprising generating, for the user, a user-asset risk score associated with each asset of the set of assets based at least in part on the user-specific network behavior information, wherein determining that the digital communication is a threat is based at least in part on a user-asset risk score associated with the at least one asset of the set of assets.

Implementation 19 is the computer-implemented method of implementation(s) 18, further comprising determining, for each asset of the set of assets, a threat-identification setting based at least in part on the respective user-asset risk score, wherein determining that the digital communication is a threat is based at least in part on the threat-identification setting associated with the at least one asset of the set of assets.

Implementation 20 is the computer-implemented method of any one of implementation(s) 1 to 19, wherein the network usage information includes (i) web browsing activity data; (ii) outgoing email traffic data; (iii) incoming email traffic data; (iv) outgoing instant message traffic data; (v) incoming instant messaging traffic data; or (vi) any combination of (i)-(v).

Implementation 21 is the computer-implemented method of any one of implementation(s) 1 to 20, wherein the digital communication is an inbound communication directed to the user.

Implementation 22 is the computer-implemented method of any one of implementation(s) 1 to 21, wherein the digital communication is an outbound communication originating from a user device associated with the user, the digital communication being directed to a third party, and wherein employing the threat-abatement procedure includes intercepting the digital communication from being transmitted to the third party.

Implementation 23 is the computer-implemented method of any one of implementation(s) 1 to 22, wherein the user-specific network behavior information includes, for each asset of the set of assets, (i) a domain associated with the respective asset; (ii) one or more subdomains associated with the respective asset; (iii) a domain category; (iv) access timing information; (v) sender information; (vi) recipient information; (vii) digital communication timing information; or (viii) any combination of (i)-(vii).

Implementation 24 is the computer-implemented method of any one of implementation(s) 1 to 23, wherein the threat-abatement procedure includes quarantining the digital communication.

Implementation 25 is the computer-implemented method of any one of implementation(s) 1 to 24, wherein the threat-abatement procedure includes initiating a user-specific training procedure, the user-specific training procedure being based at least in part on the user-specific network behavior information.

Implementation 26 is the computer-implemented method of any one of implementation(s) 1 to 25, wherein the digital communication is an email.

Implementation 27 is the computer-implemented method of any one of implementation(s) 1 to 26, wherein the digital communication is an instant message.

Implementation 28 is the computer-implemented method of any one of implementation(s) 1 to 27, wherein determining the user-specific network behavior information includes applying the network usage information to a machine learning model.

Implementation 29 is the computer-implemented method of any one of implementation(s) 1 to 28, wherein determining that the digital communication is a threat includes applying at least a portion of the digital communication to a machine learning model that has been trained based at least in part on the user-specific network behavior information.

Implementation 30 is the computer-implemented method of any one of implementation(s) 1 to 29, further comprising receiving overriding asset information, wherein determining that the digital communication is a threat is further based at least in part on the overriding asset information.

Implementation 31 is the computer-implemented method of any one of implementation(s) 1 to 30, wherein the set of assets includes a plurality of assets.

Implementation 32 is the computer-implemented method of any one of implementation(s) 1 to 31, further comprising: receiving organizational network usage information associated with the user and one or more additional users sharing an organization with the user; determining organization-specific network behavior information based on the organizational network usage information, the organization-specific network behavior information indicative of how the user and the one or more additional users have interacted with an additional set of assets, the additional set of assets including at least one asset of the set of assets; wherein determining that the digital communication is a threat is further based at least in part on the organizational network usage information.

Implementation 33 is the computer-implemented method of implementation(s) 32, further comprising generating, for the organization, a organization-asset risk score associated with each asset of the additional set of assets based at least in part on the organization-specific network behavior information, wherein determining that the digital communication is a threat is based at least in part on the organization-asset risk score associated with the at least one asset of the set of assets.

Implementation 34 is the computer-implemented method of implementation(s) 32, further comprising determining, for each asset of the additional set of assets, a organization-asset threat-identification setting based at least in part on the respective organization-asset risk score, wherein determining that the digital communication is a threat is based at least in part on the organization-asset threat-identification setting associated with the at least one asset of the set of assets.

Implementation 35 is a computer-implemented method, comprising: receiving network usage information associated with a user; determining user-specific network behavior information based on the network usage information, the user-specific network behavior information indicative of how the user has interacted with a set of assets; generating and deploying a user-specific phishing lure based at least in part on the user-specific network behavior information, wherein deploying the user-specific phishing lure facilitates presentation of the user-specific phishing lure on a user device.

Implementation 36 is the computer-implemented method of implementation(s) 35, wherein generating and deploying the user-specific phishing lure includes: generating the user-specific phishing lure; determining a target timing based on the user-specific network behavior information, wherein the target timing is determined as a time or time range in which i) the user is expected to use the user device; ii) a legitimate digital communication is expected to be received by the user; or iii) both i and ii; and deploying the user-specific phishing lure based at least in part on the target timing.

Implementation 37 is the computer-implemented method of implementation(s) 35 or 36, wherein generating and deploying the user-specific phishing lure includes: generating the user-specific phishing lure based at least in part on the user-specific network behavior information; and deploying the user-specific phishing lure.

Implementation 38 is the computer-implemented method of any one of implementation(s)s 35 to 37, further comprising: receiving a digital communication associated with at least one asset of the set of assets; wherein generating and deploying the user-specific phishing lure is further based at least in part on the received digital communication.

Implementation 39 is the computer-implemented method of implementation(s) 38, wherein generating and deploying the user-specific phishing lure occurs in response to receiving the digital communication.

Implementation 40 is the computer-implemented method of any one of implementation(s)s 35 to 39, wherein generating and deploying the user-specific phishing lure includes: selecting an asset of the set of assets based at least in part on the user-specific network behavior information; generating the user-specific phishing lure based on the selected asset, wherein the user-specific phishing lure is generated to appear to be associated with the selected asset upon receipt by the user; and deploying the user-specific phishing lure for receipt by the user.

Implementation 41 is the computer-implemented method of implementation(s) 40, wherein generating the user-specific phishing lure based on the selected asset includes: analyzing the network usage information to identify an authentic communication associated with the selected asset; generating a phishing simulation template for the selected asset based at least in part on the identified authentic communication; and generating a phishing simulation communication using the phishing simulation template.

Implementation 42 is the computer-implemented method of implementation(s) 41, wherein analyzing the network usage information to identify the authentic communication is based at least in part on a determined pattern of the user interacting with historical communications associated with the selected asset.

Implementation 43 is the computer-implemented method of implementation(s) 41 or 42, further comprising storing the generated phishing simulation template along with template information, the template information indicative of (i) the user; (ii) the asset; (iii) a time of delivery range; (iv) a delivery frequency range; or (v) any combination of (i)-(iv).

Implementation 44 is the computer-implemented method of implementation(s) 35, wherein generating and deploying the user-specific phishing lure includes: analyzing the user-specific network behavior information to identify digital communication review times associated with how long the user reviews digital communications prior to acting on the digital communications; selecting an asset of the set of assets based at least in part on the digital communication review times; generating the user-specific phishing lure based on the selected asset such that the user-specific phishing lure appears to originate from the selected asset; and deploying the user-specific phishing lure.

Implementation 45 is the computer-implemented method of implementation(s) 35, wherein generating and deploying the user-specific phishing lure includes: generating the user-specific phishing lure; analyzing the user-specific network behavior information to identify digital communication review times associated with how long the user reviews digital communications prior to acting on the digital communications; determining a target timing based at least in part on the digital communication review times; and deploying the user-specific phishing lure based at least in part on the target timing.

Implementation 46 is the computer-implemented method of implementation(s) 35, further comprising analyzing the network usage information to identify a current interaction between the user and an asset of the set of assets, wherein generating and deploying the user-specific phishing lure occurs in response to identifying the current interaction.

Implementation 47 is the computer-implemented method of implementation(s) 46, wherein the current interaction between the user and the asset includes an outgoing communication from the user to the asset.

Implementation 48 is the computer-implemented method of implementation(s) 47, wherein identifying the current interaction includes identifying an action taken based at least in part on the outgoing communication, and wherein generating and deploying the user-specific phishing lure includes: generating the user-specific phishing lure based at least in part on the identified action taken; and deploying the user-specific phishing lure.

Implementation 49 is the computer-implemented method of implementation(s) 48, wherein the user-specific phishing lure includes reference to the identified action taken. In some cases, Implementation 49 is the computer-implemented method of implementation(s) 46-48, wherein the user-specific phishing lure includes reference to the current interaction.

Implementation 50 is a system comprising: a control system including one or more processors; and a memory having stored thereon machine readable instructions; wherein the control system is coupled to the memory, and the method of any one of implementation(s)s 35 to 49 is implemented when the machine executable instructions in the memory are executed by at least one of the one or more processors of the control system.

Implementation 51 is a system for improving anti-phishing capabilities, the system including a control system configured to implement the method of any one of implementation(s)s 35 to 49.

Implementation 52 is a computer program product, embodied on a non-transitory computer readable medium, comprising instructions which, when executed by a computer, cause the computer to carry out the method of any one of implementation(s)s 35 to 49.

Implementation 53 is a computer-implemented method, comprising: conducting a phishing simulation campaign to generate and deploy a plurality of phishing lures based on one or more presentation variations; receiving simulation response information associated with the plurality of phishing lures, the simulation response information indicative of how the plurality of phishing lures were responded to; and generating scoring information based at least in part on the simulation response information and the one or more presentation variations.

Implementation 54 is the computer-implemented method of implementation(s) 53, wherein conducting the phishing simulation includes: determining the one or more presentation variations, each of the one or more presentation variations indicative of (i) a text content variation; (ii) an image content variation; (iii) a text quality variation; (iv) an image quality variation; (v) a formatting variation; (vi) a timing variation; or (vii) any combination of (i)-(vi); and automatically generating and deploying the plurality of phishing lures, wherein at least a subset of the plurality of phishing lures is generated and deployed based at least in part on the one or more presentation variations.

Implementation 55 is the computer-implemented method of implementation(s) 53, wherein conducting the phishing simulation includes: generating and deploying the plurality of phishing lures; and analyzing the plurality of phishing lures to identify one or more presentation variations present across the plurality of phishing lures, each of the one or more presentation variations indicative of (i) a text content variation; (ii) an image content variation; (iii) a text quality variation; (iv) an image quality variation; (v) a formatting variation; (vi) a timing variation; or (vii) any combination of (i)-(vi).

Implementation 56 is the computer-implemented method of any one of implementation(s)s 53 to 55, wherein generating the scoring information includes generating one or more subscores correlated with the one or more presentation variations.

Implementation 57 is the computer-implemented method of implementation(s) 56, wherein generating the scoring information includes generating at least a first subscore and a second subscore, the first subscore being correlated with a first presentation variation and the second subscore being correlated with the second presentation variation, and wherein generating the scoring information is based at least in part on the first subscore and the second subscore.

Implementation 58 is the computer-implemented method of any one of implementation(s)s 53 to 57, wherein the one or more presentation variations includes at least one timing variation, and wherein automatically generating and deploying the plurality of phishing lures includes: determining a first time to deploy a phishing lure; determining a second time based at least in part on the first time and the timing variation; deploying the phishing lure at the first time; and deploying an additional phishing lures at the second time.

Implementation 59 is the computer-implemented method of implementation(s) 53 to 58, wherein conducting the phishing simulation campaign includes: receiving network usage information associated with a plurality of users of an organization; and determining, for each of the plurality of users, user-specific network behavior information based on the network usage information, the user-specific network behavior information indicative of how the respective user has interacted with a set of assets; wherein generating and deploying the plurality of phishing lures includes generating and deploying, for each of the plurality of users, a user-specific phishing lure based at least in part on the user-specific network behavior information, wherein deploying the user-specific phishing lure facilitates presentation of the user-specific phishing lure on a user device.

Implementation 60 is the computer-implemented method of implementation(s) 59, wherein generating and deploying the plurality of phishing lures includes generating and deploying, for at least a subset of the plurality of users, the user-specific phishing lure based at least in part on the user-specific network behavior information and one of the one or more presentation variations.

Implementation 61 is the computer-implemented method of implementation(s) 59 or 60, wherein each of the user-specific phishing lures includes a hyperlink, and wherein receiving the simulation response information includes receiving an indication that at least one hyperlink of the user-specific phishing lures was activated.

Implementation 62 is the computer-implemented method of implementation(s) 59 to 61, wherein, for at least a given user of the plurality of users, generating and deploying the user-specific phishing lure includes: generating the user-specific phishing lure; determining a target timing based on the user-specific network behavior information associated with the given user, wherein the target timing is determined as a time or time range in which i) the given user is expected to use the user device; ii) a legitimate digital communication is expected to be received by the given user; or iii) both i and ii; and deploying the user-specific phishing lure based at least in part on the target timing.

Implementation 63 is the computer-implemented method of implementation(s) 59 to 62, wherein, for at least a given user of the plurality of users, generating and deploying the user-specific phishing lure includes: generating the user-specific phishing lure based at least in part on the user-specific network behavior information associated with the given user; and deploying the user-specific phishing lure.

Implementation 64 is the computer-implemented method of implementation(s) 59 to 63, wherein, for at least one of the plurality of users, generating and deploying the user-specific phishing lure occurs in response to receiving a digital communication that is associated with the given user and at least one asset of the set of assets.

Implementation 65 is the computer-implemented method of implementation(s) 59 to 64, wherein, for at least a given user of the plurality of users, generating and deploying the user-specific phishing lure includes: selecting an asset of the set of assets associated with the given user based at least in part on the user-specific network behavior information associated with the given user; generating the user-specific phishing lure based on the selected asset, wherein the user-specific phishing lure is generated to appear to be associated with the selected asset upon receipt by the given user; and deploying the user-specific phishing lure for receipt by the given user.

Implementation 66 is the computer-implemented method of implementation(s) 65, wherein, for at least the given user of the plurality of users, generating the user-specific phishing lure based on the selected asset includes: analyzing the network usage information to identify an authentic communication associated with the selected asset; generating a phishing simulation template for the selected asset based at least in part on the identified authentic communication; and generating a phishing simulation communication using the phishing simulation template.

Implementation 67 is the computer-implemented method of implementation(s) 66, wherein, for at least the given user of the plurality of users, generating the phishing simulation communication includes applying at least one of the one or more presentation variations to the phishing simulation templates.

Implementation 68 is the computer-implemented method of any one of implementation(s)s 53 to 67, wherein the one or more presentation variations includes at least one text quality variation, the text quality variation including (i) a spelling error; (ii) a grammatical error; (iii) a capitalization error; or (iv) a word spacing variation; (v) a formatting variation; (vi) a font variation; or (vii) any combination of (i)-(vi).

Implementation 69 is a system comprising: a control system including one or more processors; and a memory having stored thereon machine readable instructions; wherein the control system is coupled to the memory, and the method of any one of implementation(s)s 53 to 68 is implemented when the machine executable instructions in the memory are executed by at least one of the one or more processors of the control system.

Implementation 70 is a system for improving anti-phishing capabilities, the system including a control system configured to implement the method of any one of implementation(s)s 53 to 68.

Implementation 71 is a computer program product, embodied on a non-transitory computer readable medium, comprising instructions which, when executed by a computer, cause the computer to carry out the method of any one of implementation(s)s 53 to 68.

Implementation 72 is a computer-implemented method, comprising: receiving user environment information, the user environment information collected by an agent running on a user device being used by a user, the user environment information including information about the computing environment of the user device; and generating and deploying a user-specific phishing lure based at least in part on the user environment information, wherein deploying the user-specific phishing lure facilitates presentation of the user-specific phishing lure on the user device.

Implementation 73 is the computer-implemented method of implementation(s) 72, wherein generating and deploying the user-specific phishing lure includes: generating the user-specific phishing lure; determining a target timing based on the user environment information, wherein the target timing is determined as a time or time range in which (i) the user is expected to use the user device; (ii) a legitimate digital communication is expected to be received by the user; or (iii) both (i) and (ii); and deploying the user-specific phishing lure based at least in part on the target timing.

Implementation 74 is the computer-implemented method of implementation(s) 72 or 73, wherein generating and deploying the user-specific phishing lure includes: generating the user-specific phishing lure based at least in part on the user environment information; and deploying the user-specific phishing lure.

Implementation 75 is the computer-implemented method of any one of implementation(s)s 72 to 74, further comprising: identifying a digital communication based at least in part on the user environment information, the digital communication being associated with at least one asset of the set of assets; wherein generating and deploying the user-specific phishing lure is further based at least in part on the identified digital communication.

Implementation 76 is the computer-implemented method of any one of implementation(s)s 72 to 75, wherein generating and deploying the user-specific phishing lure occurs in response to identifying the digital communication.

Implementation 77 is the computer-implemented method of any one of implementation(s)s 72 to 76, wherein generating and deploying the user-specific phishing lure includes: selecting an asset of the set of assets based at least in part on the user environment information; generating the user-specific phishing lure based on the selected asset, wherein the user-specific phishing lure is generated to appear to be associated with the selected asset upon receipt by the user; and deploying the user-specific phishing lure for receipt by the user.

Implementation 78 is the computer-implemented method of any one of implementation(s)s 72 to 77, wherein generating and deploying the user-specific phishing lure includes: analyzing the user environment information to identify digital communication review times associated with how long the user reviews digital communications prior to acting on the digital communications; selecting an asset of the set of assets based at least in part on the digital communication review times; generating the user-specific phishing lure based on the selected asset such that the user-specific phishing lure appears to originate from the selected asset; and deploying the user-specific phishing lure.

Implementation 79 is the computer-implemented method of any one of implementation(s)s 72 to 78, wherein generating and deploying the user-specific phishing lure includes: generating the user-specific phishing lure; analyzing the user environment information to identify digital communication review times associated with how long the user reviews digital communications prior to acting on the digital communications; determining a target timing based at least in part on the digital communication review times; and deploying the user-specific phishing lure based at least in part on the target timing.

Implementation 80 is the computer-implemented method of any one of implementation(s)s 72 to 79, further comprising analyzing the user environment information to identify a current interaction between the user and an asset of the set of assets, wherein generating and deploying the user-specific phishing lure occurs in response to identifying the current interaction.

Implementation 81 is the computer-implemented method of implementation(s) 80, wherein the current interaction between the user and the asset includes an outgoing communication from the user to the asset.

Implementation 82 is the computer-implemented method of implementation(s) 81, wherein identifying the current interaction includes identifying an action taken based at least in part on the outgoing communication, and wherein generating and deploying the user-specific phishing lure includes: generating the user-specific phishing lure based at least in part on the identified action taken; and deploying the user-specific phishing lure.

Implementation 83 is the computer-implemented method of implementation(s) 82, wherein the user-specific phishing lure includes reference to the identified action taken.

Implementation 84 is the computer-implemented method of any one of implementation(s)s 72 to 83, further comprising: receiving additional user environment information, the additional user environment information collected by an additional agent running on an additional user device associated with the user, the additional user environment information including information about the computing environment of the additional user device; wherein generating and deploying the user-specific phishing lure is further based at least in part on the additional user environment information.

Implementation 85 is the computer-implemented method of any one of implementation(s)s 72 to 84, wherein the user is associated with an organization, the method further comprising: receiving additional user environment information, the additional user environment information collected by an additional agent running on an additional user device associated with an additional user, the additional user associated with the organization, the additional user environment information including information about the computing environment of the additional user device; wherein generating and deploying the user-specific phishing lure is further based at least in part on the additional user environment information.

Implementation 86 is the computer-implemented method of any one of implementation(s)s 72 to 85, further comprising: receiving network usage information associated with the user; and determining user-specific network behavior information based on the network usage information; wherein generating and deploying the user-specific phishing lure is further based at least in part on the user-specific network behavior information.

Implementation 87 is the computer-implemented method of implementation(s) 86, wherein generating and deploying the user-specific phishing lure includes: generating the user-specific phishing lure; determining a target timing based on the user-specific network behavior information, wherein the target timing is determined as a time or time range in which i) the user is expected to use the user device; ii) a legitimate digital communication is expected to be received by the user; or iii) both i and ii; and deploying the user-specific phishing lure based at least in part on the target timing.

Implementation 88 is the computer-implemented method of implementation(s) 86 or 87, wherein generating and deploying the user-specific phishing lure includes: generating the user-specific phishing lure based at least in part on the user-specific network behavior information; and deploying the user-specific phishing lure.

Implementation 89 is a system comprising: a control system including one or more processors; and a memory having stored thereon machine readable instructions; wherein the control system is coupled to the memory, and the method of any one of implementation(s)s 72 to 88 is implemented when the machine executable instructions in the memory are executed by at least one of the one or more processors of the control system.

Implementation 90 is a system for improving anti-phishing capabilities, the system including a control system configured to implement the method of any one of implementation(s)s 72 to 88.

Implementation 91 is a computer program product, embodied on a non-transitory computer readable medium, comprising instructions which, when executed by a computer, cause the computer to carry out the method of any one of implementation(s)s 72 to 88.

Implementation 92 is a computer-implemented method, comprising: receiving network usage information associated with a user; determining user-specific network behavior information based on the network usage information; receiving a first digital communication, the first digital communication being identified as a threat; generating and presenting a first alert in association with the first digital communication based at least in part on the user-specific network behavior information, the first alert generated and presented using a first set of presentation parameters; receiving a second digital communication, the second digital communication being identified as a threat; and generating and presenting a second alert in association with the second digital communication based at least in part on the user-specific network behavior information and the first alert, the second alert generated and presented using a second set of presentation parameters that is different from the first set of presentation parameters.

Implementation 93 is the computer-implemented method of implementation(s) 92, wherein presenting the first alert in association with the first digital communication includes presenting the first alert as a banner over or inline with the first digital communication, and wherein presenting the second alert in association with the second digital communication includes presenting the second alert as a banner over or inline with the second digital communication.

Implementation 94 is the computer-implemented method of implementation(s) 92 or 93, wherein each of the first set of presentation parameters and the second set of presentation parameters includes (i) a color parameter; (ii) a font parameter; (iii) a size parameter; (iv) a format parameter; (v) a position parameter; (vi) an image parameter; (vii) an alert modality parameter; (viii) an alert type parameter; or (ix) any combination of (i)-(viii).

Implementation 95 is the computer-implemented method of any one of implementation(s)s 92 to 94, further comprising receiving first alert outcome information associated with the first alert, wherein generating and presenting the second alert is further based at least in part on the first alert outcome information.

Implementation 96 is the computer-implemented method of implementation(s) 95, further comprising receiving additional network usage information after generating and presenting the first alert, wherein receiving the first alert outcome information includes determining the first alert outcome information based at least in part on the additional network usage information.

Implementation 97 is the computer-implemented method of implementation(s) 96, wherein determining the first alert outcome information includes detecting, from the additional network usage information, an action taken by the user in response to the first digital communication.

Implementation 98 is the computer-implemented method of any one of implementation(s)s 95 to 97, further comprising: receiving second alert outcome information associated with the second alert; and determining a third set of presentation parameters for a future alert based at least in part on the first alert outcome information and the second alert outcome information.

Implementation 99 is the computer-implemented method of any one of implementation(s)s 92 to 98, wherein the user-specific network behavior information is indicative of how the user has interacted with a set of assets, wherein receiving the first digital communication includes: identifying the first digital communication as being associated with at least one asset of the set of assets; and determining that the first digital communication is a threat based at least in part on the user-specific network behavior information associated with the at least one asset of the set of assets.

Implementation 100 is the computer-implemented method of implementation(s) 99, further comprising receiving additional network usage information after generating and presenting the first alert, wherein receiving the first alert outcome information includes determining the first alert outcome information based at least in part on the additional network usage information, and wherein receiving the second digital communication includes: determining that the second digital communication is a threat based at least in part on the received first alert outcome information.

Implementation 101 is the computer-implemented method of implementation(s) 99 or 100, wherein determining the user-specific network behavior information includes: identifying a set of assets accessed by the user based at least in part on the network usage information; and determining user-asset activity data associated with the user interacting with the set of assets, wherein determining the user-asset activity data includes, for each asset of the set of assets, determining interaction data between the user and the respective asset based at least in part on the network usage information, the interaction data indicative of one or more interactions between the user and the asset; wherein determining that the first digital communication is a threat is based at least in part on the user-asset activity data.

Implementation 102 is the computer-implemented method of implementation(s) 101, wherein determining the user-specific network behavior information includes determining, for each of the set of assets, an access frequency associated with the respective asset, wherein determining that the digital communication is a threat is based at least in part on the access frequency.

Implementation 103 is the computer-implemented method of any one of implementation(s)s 99 to 102, wherein generating and presenting the first alert includes selecting the first set of presentation parameters based at least in part on the at least one asset.

Implementation 104 is the computer-implemented method of any one of implementation(s)s 99 to 103, wherein each the set of assets is a network-accessible asset that accepts user credentials.

Implementation 105 is the computer-implemented method of implementation(s) 104, wherein the set of assets includes at least one Internet-accessible website and at least one Internet-accessible software-as-a-service (SAAS) product.

Implementation 106 is the computer-implemented method of any one of implementation(s)s 92 to 105, wherein generating and presenting the first alert includes: determining, based at least in part on the user-specific network behavior information, user-specific reasoning for why the first digital communication is identified as a threat; and presenting the user-specific reasoning.

Implementation 107 is the computer-implemented method of implementation(s) 106, wherein the user-specific network behavior information includes web browsing activity data associated with the user accessing a website associated with the at least one asset of the set of assets, and wherein determining the user-specific reasoning is based at least in part on the web browsing activity data.

Implementation 108 is a system comprising: a control system including one or more processors; and a memory having stored thereon machine readable instructions; wherein the control system is coupled to the memory, and the method of any one of implementation(s) 92 to 107 is implemented when the machine executable instructions in the memory are executed by at least one of the one or more processors of the control system.

Implementation 109 is a system for improving anti-phishing capabilities, the system including a control system configured to implement the method of any one of implementation(s) 92 to 107.

Implementation 110 is a computer program product, embodied on a non-transitory computer readable medium, comprising instructions which, when executed by a computer, cause the computer to carry out the method of any one of implementation(s) 92 to 107.

Implementation 111 is a computer-implemented method, comprising: receiving a digital communication; receiving an indication that the digital communication is identified as a threat; generating a hash of the digital communication; receiving a subsequent digital communication; determining that the subsequent digital communication satisfies the hash; and identifying the subsequent digital communication as a threat in response to determining that the subsequent digital communication satisfies the hash.

Implementation 112 is the computer-implemented method of implementation(s) 111, further comprising: receiving network usage information associated with a user, the user being a recipient of the digital communication; and determining user-specific network behavior information based on the network usage information; wherein receiving the indication that the digital communication is identified as a threat includes determining that the digital communication is a threat based at least in part on the user-specific network behavior information.

Implementation 113 is the computer-implemented method of implementation(s) 112, wherein the user-specific network behavior information is indicative of how the user has interacted with a set of assets, wherein determining that the digital communication is a threat includes: identifying the digital communication as being associated with at least one asset of the set of assets; and determining that the digital communication is a threat based at least in part on the user-specific network behavior information associated with the at least one asset of the set of assets.

Implementation 114 is the computer-implemented method of implementation(s) 113, wherein determining the user-specific network behavior information includes: identifying a set of assets accessed by the user based at least in part on the network usage information; and determining user-asset activity data associated with the user interacting with the set of assets, wherein determining the user-asset activity data includes, for each asset of the set of assets, determining interaction data between the user and the respective asset based at least in part on the network usage information, the interaction data indicative of one or more interactions between the user and the asset.

Implementation 115 is the computer-implemented method of implementation(s) 114, wherein determining the user-specific network behavior information includes determining, for each of the set of assets, an access frequency associated with the respective asset, wherein determining that the digital communication is a threat is based at least in part on the access frequency.

Implementation 116 is the computer-implemented method of any one of implementation(s)s 113 to 115, wherein each the set of assets is a network-accessible asset that accepts user credentials.

Implementation 117 is the computer-implemented method of implementation(s) 116, wherein the set of assets includes at least one Internet-accessible website and at least one Internet-accessible software-as-a-service (SAAS) product.

Implementation 118 is the computer-implemented method of any one of implementation(s)s 113 to 117, further comprising generating an interaction fingerprint associated with the at least one asset of the set of assets based at least in part on the user-specific network behavior information associated with the at least one asset of the set of assets, wherein determining that the digital communication is a threat includes determining that the digital communication does not fit the interaction fingerprint.

Implementation 119 is the computer-implemented method of implementation(s) 118, wherein generating the interaction fingerprint includes determining, based at least in part on timestamp information associated with a plurality of interactions associated with the at least one asset of the set of assets, at least one of (i) an acceptable timing range for interactions with the at least one asset of the set of assets, and (ii) an acceptable frequency range between interactions with the at least one asset of the set of assets; and wherein determining that the digital communication does not fit the interaction fingerprint includes determining that a timing of the digital communication falls outside of the acceptable timing range and/or falls outside of the acceptable frequency range with respect to a prior digital communication associated with the at least one asset of the set of assets.

Implementation 120 is the computer-implemented method of implementation(s) 118 or 119, further comprising: receiving an additional digital communication associated with the at least one asset of the set of assets; determining that the additional digital communication is not a threat; and updating the interaction fingerprint based at least in part on the additional digital communication.

Implementation 121 is the computer-implemented method of any one of implementation(s)s 118 to 120, further comprising: updating the interaction fingerprint based at least in part on the subsequent digital communication.

Implementation 122 is the computer-implemented method of any one of implementation(s)s 112 to 121, wherein generating the hash is based at least in part on a portion of the user-specific network behavior information associated with the digital communication.

Implementation 123 is the computer-implemented method of any one of implementation(s)s 112 to 122, wherein determining the user-specific network behavior information includes: determining first interaction data indicative of how the user has interacted with the at least one asset of the set of assets; and determining second interaction data indicative of how the user has interacted with a second asset of the set of assets, the second asset not included in the at least one asset of the set of assets; and wherein determining that the digital communication is a threat is based at least in part on the first interaction data and the second interaction data.

Implementation 124 is the computer-implemented method of any one of implementation(s)s 111 to 122, wherein the user is a recipient of the subsequent digital communication.

Implementation 125 is a system comprising: a control system including one or more processors; and a memory having stored thereon machine readable instructions; wherein the control system is coupled to the memory, and the method of any one of implementation(s)s 111 to 124 is implemented when the machine executable instructions in the memory are executed by at least one of the one or more processors of the control system.

Implementation 126 is a system for improving anti-phishing capabilities, the system including a control system configured to implement the method of any one of implementation(s)s 111 to 124.

Implementation 127 is a computer program product, embodied on a non-transitory computer readable medium, comprising instructions which, when executed by a computer, cause the computer to carry out the method of any one of implementation(s)s 111 to 124.

What is claimed is:

1. A computer-implemented method comprising:
receiving network usage information associated with a user;
determining user-specific network behavior information based on the network usage information, the user-specific network behavior information indicative of how the user has interacted with a set of assets;
determining, based at least in part on timestamp information associated with a plurality of interactions associated with at least one asset of the set of assets, (i) an acceptable timing range for interactions with the at least one asset of the set of assets, (ii) an acceptable frequency range between interactions with the at least one asset of the set of assets, or (iii) both (i) and (ii);
receiving a digital communication;
identifying the digital communication as being associated with the at least one asset of the set of assets;
determining that the digital communication is a threat based at least in part on (i) the user-specific network behavior information associated with the at least one asset of the set of assets and (ii) a determination that a timing of the digital communication falls outside of the acceptable timing range and/or falls outside of the acceptable frequency range; and
employing a threat-abatement procedure with respect to the digital communication.

2. The computer-implemented method of claim 1, wherein determining the user-specific network behavior information includes:
identifying the set of assets accessed by the user based at least in part on the network usage information; and
determining user-asset activity data associated with the user interacting with the set of assets, wherein determining the user-asset activity data includes, for each asset of the set of assets, determining interaction data between the user and the respective asset based at least in part on the network usage information, the interaction data indicative of one or more interactions between the user and the asset.

3. The computer-implemented method of claim 2, wherein determining the user-specific network behavior information includes determining, for each of the set of assets, an access frequency associated with the respective asset, wherein determining that the digital communication is a threat is based at least in part on the access frequency.

4. The computer-implemented method of claim 1, wherein each asset of the set of assets is a network-accessible asset that accepts user credentials.

5. The computer-implemented method of claim 4, wherein the set of assets includes at least one Internet-accessible website and at least one Internet-accessible software-as-a-service (SAAS) product.

6. The computer-implemented method of claim 1, wherein employing the threat-abatement procedure includes:
generating an alert indicative that the digital communication is identified as a threat; and
presenting the alert to the user.

7. The computer-implemented method of claim 6, wherein generating the alert includes determining, based at least in part on the user-specific network behavior information, user-specific reasoning for why the digital communication is identified as a threat, and wherein presenting the alert to the user includes presenting the user-specific reasoning.

8. The computer-implemented method of claim 7, wherein the user-specific network behavior information includes web browsing activity data associated with the user accessing a website associated with the at least one asset of the set of assets, and wherein determining the user-specific reasoning is based at least in part on the web browsing activity data.

9. The computer-implemented method of claim 8, wherein presenting the alert to the user includes presenting a banner in association with the digital communication, wherein presenting the banner in association with the digital communication includes (i) inserting the banner in the body of an email; (ii) presenting the banner inline with a message; (iii) presenting the banner in an alert window; or (iv) any combination of (i), (ii), and (iii).

10. The computer-implemented method of claim 6, wherein presenting the alert to the user includes presenting a modal alert before presenting the digital communication, the modal alert including an option to continue without presenting the digital communication.

11. The computer-implemented method of claim 1, further comprising generating an interaction fingerprint associated with the at least one asset of the set of assets based at least in part on the user-specific network behavior information associated with the at least one asset of the set of assets, wherein determining that the digital communication is a threat includes determining that the digital communication does not fit the interaction fingerprint.

12. The computer-implemented method of claim 1,
wherein determining the user-specific network behavior information includes:
determining first interaction data indicative of how the user has interacted with the at least one asset of the set of assets; and
determining second interaction data indicative of how the user has interacted with a second asset of the set of assets, the second asset not included in the at least one asset of the set of assets; and wherein determining that the digital communication is a threat is based at least in part on the first interaction data and the second interaction data.

13. The computer-implemented method of claim 12, further comprising:
    modifying a first threat-identification setting to adjust a first security response associated with a first asset of the set of assets based at least in part on the first interaction data; and
    modifying a second threat-identification setting to adjust a second security response associated with a second asset of the set of assets based at least in part on the second interaction data, wherein the first security response and the second security response are different.

14. The computer-implemented method of claim 1, further comprising generating, for the user, a user-asset risk score associated with each asset of the set of assets based at least in part on the user-specific network behavior information, wherein determining that the digital communication is a threat is based at least in part on a user-asset risk score associated with the at least one asset of the set of assets.

15. The computer-implemented method of claim 14, further comprising determining, for each asset of the set of assets, a threat-identification setting based at least in part on the respective user-asset risk score, wherein determining that the digital communication is a threat is based at least in part on the threat-identification setting associated with the at least one asset of the set of assets.

16. The computer-implemented method of claim 1, wherein the network usage information includes (i) web browsing activity data; (ii) outgoing email traffic data; (iii) incoming email traffic data; (iv) outgoing instant message traffic data; (v) incoming instant messaging traffic data; or (vi) any combination of (i)-(v).

17. The computer-implemented method of claim 1, wherein the digital communication is an outbound communication originating from a user device associated with the user, the digital communication being directed to a third party, and wherein employing the threat-abatement procedure includes intercepting the digital communication from being transmitted to the third party.

18. The computer-implemented method of claim 1, wherein the user-specific network behavior information includes, for each asset of the set of assets, (i) a domain associated with the respective asset; (ii) one or more sub-domains associated with the respective asset; (iii) a domain category; (iv) access timing information; (v) sender information; (vi) recipient information; (vii) digital communication timing information; or (viii) any combination of (i)-(vii).

19. The computer-implemented method of claim 1, wherein the threat-abatement procedure includes quarantining the digital communication.

20. The computer-implemented method of claim 1, wherein the threat-abatement procedure includes initiating a user-specific training procedure, the user-specific training procedure being based at least in part on the user-specific network behavior information.

21. The computer-implemented method of claim 1, wherein the digital communication is an email.

22. The computer-implemented method of claim 1, wherein the digital communication is an instant message.

23. The computer-implemented method of claim 1, wherein determining the user-specific network behavior information includes applying the network usage information to a machine learning model.

24. The computer-implemented method of claim 1, wherein determining that the digital communication is a threat includes applying at least a portion of the digital communication to a machine learning model that has been trained based at least in part on the user-specific network behavior information.

25. The computer-implemented method of claim 1, further comprising receiving overriding asset information, wherein determining that the digital communication is a threat is further based at least in part on the overriding asset information.

26. The computer-implemented method of claim 1, wherein the set of assets includes a plurality of assets.

27. The computer-implemented method of claim 1, further comprising:
    receiving organizational network usage information associated with the user and one or more additional users sharing an organization with the user;
    determining organization-specific network behavior information based on the organizational network usage information, the organization-specific network behavior information indicative of how the user and the one or more additional users have interacted with an additional set of assets, the additional set of assets including at least one asset of the set of assets;
    wherein determining that the digital communication is a threat is further based at least in part on the organizational network usage information.

28. The computer-implemented method of claim 27, further comprising generating, for the organization, a organization-asset risk score associated with each asset of the additional set of assets based at least in part on the organization-specific network behavior information, wherein determining that the digital communication is a threat is based at least in part on the organization-asset risk score associated with the at least one asset of the set of assets.

29. The computer-implemented method of claim 27, further comprising determining, for each asset of the additional set of assets, a organization-asset threat-identification setting based at least in part on the respective organization-asset risk score, wherein determining that the digital communication is a threat is based at least in part on the organization-asset threat-identification setting associated with the at least one asset of the set of assets.

* * * * *